US011452300B2

(12) United States Patent
Wilmott et al.

(10) Patent No.: US 11,452,300 B2
(45) Date of Patent: Sep. 27, 2022

(54) COMPOSITIONS HAVING AN OIL-IN-WATER DISPERSION OF SUBMICRON PARTICLES TO ENHANCE FOODS AND BEVERAGES

(71) Applicant: LEADING EDGE INNOVATIONS, LLC, Branchburg, NJ (US)

(72) Inventors: James Michael Wilmott, Bangor, PA (US); Michael Alan Ross, Nazareth, PA (US)

(73) Assignee: LEADING EDGE INNOVATIONS, LLC, Branchburg, NJ (US)

( * ) Notice: Subject to any disclaimer, the term of this patent is extended or adjusted under 35 U.S.C. 154(b) by 355 days.

(21) Appl. No.: 16/701,477

(22) Filed: Dec. 3, 2019

(65) Prior Publication Data

US 2020/0100518 A1 Apr. 2, 2020

Related U.S. Application Data

(60) Continuation of application No. 14/698,895, filed on Apr. 29, 2015, now Pat. No. 10,531,674, which is a division of application No. 14/286,323, filed on May 23, 2014, now abandoned, which is a continuation-in-part of application No. 14/211,562, filed on Mar. 14, 2014, now Pat. No. 9,357,770, which is a continuation-in-part of application No. 13/835,642, filed on Mar. 15, 2013.

(60) Provisional application No. 61/801,055, filed on Mar. 15, 2013.

(51) Int. Cl.
| | |
|---|---|
| *A23D 7/00* | (2006.01) |
| *A23D 7/02* | (2006.01) |
| *A23D 7/04* | (2006.01) |
| *A23D 7/005* | (2006.01) |
| *A21D 2/16* | (2006.01) |
| *A23L 2/52* | (2006.01) |
| *A23L 2/56* | (2006.01) |
| *A23L 33/105* | (2016.01) |
| *A23L 27/60* | (2016.01) |
| *A23P 10/30* | (2016.01) |
| *A23L 27/00* | (2016.01) |
| *A23L 27/12* | (2016.01) |

(52) U.S. Cl.
CPC ............... *A23D 7/00* (2013.01); *A21D 2/165* (2013.01); *A23D 7/0053* (2013.01); *A23D 7/02* (2013.01); *A23D 7/04* (2013.01); *A23L 2/52* (2013.01); *A23L 2/56* (2013.01); *A23L 27/13* (2016.08); *A23L 27/60* (2016.08); *A23L 27/80* (2016.08); *A23L 33/105* (2016.08); *A23P 10/30* (2016.08)

(58) Field of Classification Search
CPC ............... A23D 7/00; A23D 7/02; A23D 7/04
See application file for complete search history.

(56) References Cited

U.S. PATENT DOCUMENTS

| | | | |
|---|---|---|---|
| 2,217,698 A | 10/1940 | Musher | |
| 3,208,911 A | 9/1965 | Oppliger | |
| 3,964,500 A | 6/1976 | Drakoff | |
| 1,152,416 A | 5/1979 | Dorothea et al. | |
| 4,152,416 A | 5/1979 | Spitzer et al. | |
| 1,341,799 A | 7/1982 | Good | |
| 4,341,799 A | 7/1982 | Good | |
| 4,364,837 A | 12/1982 | Pader | |
| 4,465,619 A | 8/1984 | Boskamp | |
| 4,592,859 A | 6/1986 | Smith-Johannsen | |
| 4,606,913 A | 8/1986 | Aronson et al. | |
| 4,720,390 A | 1/1988 | Bachler et al. | |
| 4,788,006 A | 11/1988 | Bolich, Jr. et al. | |
| 4,952,859 A | 8/1990 | Torisawa et al. | |
| 5,011,701 A | 4/1991 | Baer et al. | |
| 5,021,248 A | 6/1991 | Stark et al. | |
| 5,330,778 A * | 7/1994 | Stark ..................... | A23J 3/14 |
| | | | 426/531 |

(Continued)

FOREIGN PATENT DOCUMENTS

| | | |
|---|---|---|
| AU | 2011213719 A1 | 3/2013 |
| CN | 1125145 A | 6/1996 |

(Continued)

OTHER PUBLICATIONS

International Search Report of PCT/US2014/025734 dated Aug. 14, 2014, 3 pages.
Williams, et al.; "Penelialion Enhancers", Advanced Drug Delivery Reviews, vol. 64, 2012, pp. 128-137, available online Sep. 13, 2012.
Wilmott et al.; "Substantially Surfactant-Free, Submicron Dispersions of Hydrophobic Agents Containing High Levels of Water Miscible Solvent", U.S. Appl. No. 14/211,562, filed Mar. 14, 2014, pp. 1-43.

(Continued)

*Primary Examiner* — Jeffrey P Mornhinweg
(74) *Attorney, Agent, or Firm* — Ohlandt, Greeley, Ruggiero and Perle, LLP (57) ABSTRACT

A composition having an oil-in-water dispersion with enhanced stability is provided. The oil-in-water dispersion has particles of a hydrophobic agent with an average particle size between about 100 to about 999 nm, where the distribution of particle sizes are a monodispersity about the average particle size, and the negative charge on the particles generates a force of repulsion that exceeds the force of coalescence among the particles of the hydrophobic agent in the oil-in-water dispersion. A method for applying the composition to a food and/or beverage is also provided. The submicron average particle size, dispersity, and force of repulsion of the particles in the dispersion increase the extent of penetration and accelerate diffusion of the particles of the hydrophobic agent throughout a water phase of a food or beverage, to enhance the physical, chemical, nutritional and/or sensory properties of the food or beverage, and to prevent freezer burn.

19 Claims, 1 Drawing Sheet

(56) References Cited

U.S. PATENT DOCUMENTS

| | | |
|---|---|---|
| 5,425,956 A | 6/1995 | Shahidi et al. |
| 5,637,291 A | 6/1997 | Bara et al. |
| 5,688,528 A | 11/1997 | Carlsson et al. |
| 5,716,638 A | 2/1998 | Touitou |
| 5,928,632 A | 7/1999 | Reusch |
| 5,928,832 A | 7/1999 | Smith et al. |
| 6,068,961 A | 5/2000 | Dutoff et al. |
| 6,190,686 B1 | 2/2001 | Isager et al. |
| 6,268,102 B1 | 7/2001 | Hopper et al. |
| 6,391,321 B1 | 5/2002 | Gers-Barlag et al. |
| 6,423,363 B1 | 7/2002 | Traska et al. |
| 6,436,413 B1 | 8/2002 | Gers-Barlag et al. |
| 6,485,756 B1 | 11/2002 | Aust et al. |
| 6,782,307 B2 | 8/2004 | Wilmott et al. |
| 6,863,914 B1 | 3/2005 | Auweter et al. |
| 7,250,455 B2 | 7/2007 | Cody et al. |
| 7,270,832 B2 | 9/2007 | Bryson et al. |
| 7,306,819 B2 | 12/2007 | Lerchenfeld et al. |
| 7,709,445 B2 | 5/2010 | Soula et al. |
| 8,034,381 B2 | 10/2011 | Moschwitzer |
| 8,114,386 B2 | 2/2012 | Kantner et al. |
| 8,597,678 B2 | 12/2013 | Fountain et al. |
| 8,618,081 B2 | 12/2013 | Tamarkin et al. |
| 9,357,770 B2 | 6/2016 | Wilmott et al. |
| 2002/0127257 A1 | 9/2002 | Gers-Barlag et al. |
| 2002/0146375 A1 | 10/2002 | Schreiber et al. |
| 2003/0021547 A1 | 1/2003 | Bolle et al. |
| 2003/0215470 A1 | 11/2003 | Wilmott et al. |
| 2003/0215471 A1 | 11/2003 | Wilmott et al. |
| 2003/0228267 A1 | 12/2003 | Aust et al. |
| 2004/0082654 A1 | 4/2004 | Pesce et al. |
| 2005/0065239 A1 | 3/2005 | Cody et al. |
| 2005/0266055 A1 | 12/2005 | Stiller et al. |
| 2007/0023779 A1 | 2/2007 | Hirose et al. |
| 2007/0087022 A1 | 4/2007 | Desai et al. |
| 2007/0104665 A1 | 5/2007 | Jones et al. |
| 2007/0116761 A1 | 5/2007 | Desai et al. |
| 2007/0122465 A1 | 5/2007 | Desai et al. |
| 2007/0122468 A1 | 5/2007 | Desai et al. |
| 2007/0154539 A1 | 7/2007 | Fountain et al. |
| 2007/0237798 A1 | 10/2007 | Apostol et al. |
| 2007/0264295 A1 | 11/2007 | Kantner |
| 2008/0075808 A1 | 3/2008 | Altemueller |
| 2008/0093586 A1 | 4/2008 | Koch et al. |
| 2008/0102128 A1 | 5/2008 | Constancis et al. |
| 2008/0274195 A1 | 11/2008 | Nicolosi et al. |
| 2009/0004278 A1 | 1/2009 | Aimi et al. |
| 2009/0019697 A1 | 1/2009 | Dodd |
| 2009/0155409 A1 | 6/2009 | Sexton et al. |
| 2009/0196972 A1 | 8/2009 | Monsalve-Gonzalez et al. |
| 2009/0226498 A1 | 9/2009 | Flugge-Berendes et al. |
| 2009/0280148 A1 | 11/2009 | Makiko et al. |
| 2010/0143424 A1 | 6/2010 | Kanazawa |
| 2010/0203121 A1 | 8/2010 | Toledano et al. |
| 2010/0264364 A1 | 10/2010 | Wagner et al. |
| 2010/0285113 A1 | 11/2010 | Shoichet et al. |
| 2010/0305218 A1 | 12/2010 | Wooster et al. |
| 2010/0323014 A1 | 12/2010 | Bloom et al. |
| 2011/0281827 A1 | 11/2011 | Dov et al. |
| 2011/0305737 A1 | 12/2011 | Alexiades-Armenakas et al. |
| 2012/0027865 A1 | 2/2012 | Kumar et al. |
| 2012/0093718 A1 | 4/2012 | Parchment et al. |
| 2012/0244134 A1 | 9/2012 | Chen et al. |
| 2012/0308627 A1 | 12/2012 | Gunes et al. |
| 2013/0004640 A1 | 1/2013 | Zhang et al. |
| 2013/0064954 A1 | 3/2013 | Ochomogo et al. |
| 2013/0122071 A1 | 5/2013 | Cathala et al. |
| 2014/0113852 A1 | 4/2014 | Bongers et al. |
| 2014/0134255 A1 | 5/2014 | Saito et al. |
| 2014/0161854 A1 | 6/2014 | Kotyla |
| 2014/0272071 A1 | 9/2014 | Wilmott et al. |
| 2016/0213757 A1 | 7/2016 | Edelson et al. |
| 2016/0250111 A1 | 9/2016 | Wilmott et al. |
| 2020/0100518 A1 | 4/2020 | Wilmott et al. |

FOREIGN PATENT DOCUMENTS

| | | |
|---|---|---|
| CN | 1125145 C | 10/2003 |
| CN | 101073557 A | 11/2007 |
| EP | 2162120 A2 | 3/2010 |
| EP | 2 228 058 A1 | 9/2010 |
| GB | 1114436 | 5/1968 |
| JP | 60-244335 S | 12/1985 |
| JP | 2000-95634 A | 4/2000 |
| JP | 2000-95636 A | 4/2000 |
| JP | 2000-95638 A | 4/2000 |
| JP | 2002-142671 A | 5/2002 |
| JP | 2002-543263 A | 12/2002 |
| JP | 2004-501068 A | 1/2004 |
| JP | 2004-57042 A | 2/2004 |
| JP | 2004-346039 A | 12/2004 |
| JP | 2006-256971 A | 9/2006 |
| JP | 2007-117021 A | 5/2007 |
| JP | 2007-184542 A | 7/2007 |
| JP | 2007-238549 A | 9/2007 |
| JP | 2008-013470 A | 1/2008 |
| JP | 2009-518027 A | 5/2009 |
| JP | 2010-124817 A | 6/2010 |
| JP | 2013-49668 A | 3/2013 |
| WO | 2002/34218 A2 | 5/2002 |
| WO | 2002/034218 A2 | 5/2002 |
| WO | 2007/120500 A2 | 10/2007 |
| WO | 2013/018584 A1 | 2/2013 |

OTHER PUBLICATIONS

Written Opinion of PCT/US2014/025734 dated Aug. 14, 2014, 7 pages.

International Search Report and Written Opinion dated Dec. 29, 2014 from PCT/US2014/027727, 17 pages.

Wilmott et al.; "Surfactant-Free, Submicron Hydrophobic Dispersions and Food Enhancement Therewith", U.S. Appl. No. 13/835,642, filed Mar. 15, 2013, pp. 1-34.

International Search Report dated Jan. 31, 2022 from corresponding International Patent Application No. PCT/US2021/056802, 3 pages.

Written Opinion dated Jan. 31, 2022 from corresponding International Patent Application No. PCT/US2021/056802, 4 pages.

Glycerol; Wikipedia article; Retrieved from "https://en.wikipedia.org/w/index.php?title=Glycerol&oldid=9833894125" published on Oct. 14, 2020, Abstract on p. 1.

Flanagan et al.; "Microemulsions: A Potential Delivery System for Bioactives in Food"; Critical Rev. Food Sci Nutrition, vol. 46, pp. 221-237, 2006 Abstract; Figgure 2, Figure 6.

Ganapathy, Venkatesh; "Spice Oleoresins", Jun. 2012.

American Lecithin Company 80 and 80H Technical data sheet, retrieved 2017.

\* cited by examiner

COMPOSITIONS HAVING AN OIL-IN-WATER DISPERSION OF SUBMICRON PARTICLES TO ENHANCE FOODS AND BEVERAGES

CROSS-REFERENCE TO RELATED APPLICATIONS

This application is a continuation of U.S. patent application Ser. No. 14/698,895, filed on Apr. 29, 2015, which is a divisional of U.S. patent application Ser. No. 14/286,323, filed on Apr. 29, 2015, which is continuation-in-part application of U.S. patent application Ser. No. 14/211,562, filed on Mar. 14, 2014, now U.S. Pat. No. 9,357,770, and also a continuation-in-part application of U.S. patent application Ser. No. 13/835,642, filed on Mar. 15, 2013, which claims the benefit of U.S. Provisional Application No. 61/801,055, filed on Mar. 15, 2013, the contents of all of which are incorporated by reference herein.

BACKGROUND OF THE DISCLOSURE

1. Field of Disclosure

The present disclosure relates to a composition having an oil-in-water dispersion with enhanced stability that can be applied into or onto a food or beverage to enhance the physical, chemical, nutritional, and/or sensory properties of the food or beverage, and also to prevent freezer burn. More particularly, the present disclosure relates to a composition having an oil-in-water dispersion with particles of a hydrophobic agent having an average particle size between about 100 to about 999 nm. The distribution of particles are monodispersed about the average particle size, with at least 75 wt % of the particles having a particle size that is ±300 nm of the average particle size. A small negative charge imparted to each of the particles by the mechanical process employed to form the oil-in-water dispersion causes the particles to repel each other, further enhancing stability of the dispersion.

2. Description of Related Art

Conventional techniques for combining a hydrophobic material (such as a liquid, semi-solid, or solid) with a hydrophilic liquid require the addition of agents that change the properties of both the hydrophobic material and the hydrophilic liquids so that they more closely resemble one another. As the properties of the two phases converge because of the additives, they have a greater propensity to be stable for a commercially viable period of time. An important class of additives that can be used in these hydrophobic phase/hydrophilic phase combinations is the surface active agent, which is typically referred to as a "surfactant" which have both hydrophobic and hydrophilic properties.

When one or more of the surface active agents are incorporated into the hydrophobic phase or the hydrophilic phase or both, the surfactants will align themselves at the hydrophobic phase-hydrophilic phase interface or at the interface between the composition and the surrounding air. The force that exists at the hydrophobic phase-hydrophilic phase interface ("Interfacial Tension") is reduced allowing the two phases to more favorably coexist. Similarly, the force that exists at the air-composition interface ("Surface Tension") is also reduced. A special sub-category of surfactants is called an emulsifier. When carefully selected, such emulsifiers have a wide range of surface-active properties. These materials not only lower interfacial tension at the hydrophobic phase/hydrophilic phase interface but, with the input of shearing energy, enable the formation of stable droplets of one phase within the other. The resulting product is called an emulsion. In many cases such emulsions are prepared by heating the hydrophobic and hydrophilic phases to a temperature of 70° C. or greater before combining the two phases. The purpose of heating the phases is to ensure that all semi-solid and solid hydrophobic materials used are melted, and that the two phases have a low enough viscosity so the two phases can mix freely. The hydrophobic and hydrophilic phases are mixed together until they achieve a homogeneous appearance. Thereafter, the mixture is cooled to ensure the formation of appropriately sized droplets, usually in the 3 micron to 10 micron range. Such emulsions typically have a homogeneous, opaque, white appearance due to their particle size.

Although surfactants have provided many benefits, the use of surfactants in foods has several disadvantages, including producing emulsions that are thermodynamically unstable, non-reproducible, difficult-to-scale and are potentially unhealthy when consumed.

The time to develop a traditional emulsifier-based product is lengthy. When changes to either the aqueous phase or oil phase are made, for example due to supply issues or changing consumer preferences, the previously effective emulsifier blend generally must be altered. Such changes may undesirably result in a change in one or more aesthetic, performance, or health properties. Immediate stability of the composition is often compromised as a result and, worse, resulting instability may not be identified until the second or third month of accelerated stability testing. This can compromise the long-term shelf life of the product. Correction requires a complex, often empirical, rebalancing of the formulation.

Compounding these production and stability issues are the effects that processing can have on the outcome of a batch. Emulsion stability is dependent on a variety of parameters such as the zeta potential, particle size, crystal formation, and water binding activity of the ingredients employed to achieve the desired rheological properties of the product. These parameters are dependent on the temperature to which the oil and water phases are heated, the rate of heating, the method and rate of mixing of the phases when combined at elevated temperatures, and the rate of cooling. Most emulsions require heating to ensure that all higher melting point materials, such as waxes and butters, are completely melted, dissolved, or dispersed in the appropriate phase or to accelerate the hydration of starches and other thickening agents.

Some emulsions are made without heating but these systems preclude the use of higher melting point materials that can add richness to the oral aesthetics of the final product. Further, if the rate of mixing is high, there is a chance that air can be entrapped in the emulsion. This phenomenon causes an undesirable decrease in the specific gravity of the product and an increase in product viscosity. Any variability in processing can lead to a range of undesirable rheological and textural properties. This issue can occur even if the formulation is not modified. Often, if two or more formulators prepare the same product, the resulting compositions may vary considerably. This surprising variation can occur even though each person utilized the same lots of raw ingredients. The unsettling phenomenon occurs because it may be very difficult to exactly reproduce all of the processing parameters used to make an emulsion. If processing variables vary in small, difficult-to-track ways, unexpected particle size variations may occur, or the crystalline properties of the emulsion can be compromised.

Given these concerns, a typical 500-g to 2000-g lab preparation may not translate directly to a manufacturing environment. Moreover, equipment used in the laboratory generally does not well model that used in the plant. There is usually a need for an intermediate development phase during scale-up that facilitates this transition. Some equipment for this intermediate phase is engineered to mimic plant conditions but at a fraction of the size. Even so, scale-up issues abound. To deal with the vagaries of scale-up, the product may be subjected to a wide range of processing variations in order to optimize the conditions of manufacture. Products made at each level of scale-up are typically subjected to accelerated stability testing to ensure the integrity of the product for its anticipated shelf life. These issues increase the time and cost of bringing a new product into production. As a consequence, most formulators tend to stay with certain tried and true approaches of the past, thereby minimizing uniqueness and ingenuity.

Traditional emulsion systems also create difficulties in manufacturing. The need for heating and cooling systems, specialized mixing equipment, and assorted additional processing devices makes the manufacture of emulsion systems capital intensive. Further, the equipment specifications and energy requirements will vary from country to country. This situation will cause a modification in the processing variables thereby making it almost impossible to have a truly "global" manufacturing protocol. The energy needed to process such products can be costly. Similarly, there is typically a long batch processing time. It can take from 5 to 24 hours, or more, to complete the processing of emulsions depending on the batch size and number of sub-phases required. This reality requires intensive labor that adds to cost.

In the surfactant mediated process, the need for high temperature water or steam to heat the phases of the batch can cause damage to heat sensitive hydrophobic agents. Prolonged heating of certain materials can accelerate the reaction of the hydrophobic agent with other components in the emulsion, or with air. For example, unsaturated hydrocarbons, such as vegetable oils, can oxidize, which lead to rancidity or an undesirable color change. Prolonged heating can reduce the potency of hydrophobic nutritional compounds, such as vitamins and antioxidants, as well as modify flavor-providing molecules. In today's market, consumers are less accepting of non-natural stabilizing agents (such as preservatives, artificial flavors or aromas, chelating agents, and synthetic antioxidants) to address these concerns.

The presence of surfactants, preservatives, chelating agents, and other synthetic additives raises safety and health concerns in consumers. These materials are perceived to be artificial and not natural. Their inclusion creates processed food, which has been linked to obesity, diabetes, carcinogenicity, teratology, arthritis, high blood pressure, arteriosclerosis, and a compromised immune system. Because of these issues there is rising regulatory pressure and pressure from consumer activists to remove such artificial agents from compositions intended for human consumption.

The presence of emulsifiers in food products as well as the super-micron particle size micelles that they form can also result in a sub-optimal taste sensation and limited textural variability creating a less enjoyable eating or drinking experience.

Surfactant micelles, nanospheres, nanoparticles, nanoemulsions, nanocochleates, liposomes, nanoliposomes, and other encapsulating delivery systems have been used to address some of the issues described above. Mozafari, et al. describe the various ways to make liposomes and nanoliposomes, which are closed, continuous, vesicular structures composed mainly of phospholipid bilayer(s) in an aqueous environment (2008, Journal of Liposomal Research 18:309-327). However, these systems contain either a specific bi-layer structure or other encapsulating techniques such as cyclodextrin entrapment or crosslinked polycarbohydrate encapsulate. Further, the surfactant micelles, nanospheres, nanoparticles, and nanoemulsions contain emulsifiers that allow them to achieve their final size. In addition, these systems are all considered to be nano-technology as defined by convention and multiple regulatory agencies (less than 100 nm), giving rise to regulatory issues. There are growing health and safety concerns about the application of nano-technology in foods.

Conventional food processing employs a wide range of physical and chemical treatments of foods. For example, conventional processing of red meats includes the following methods and devices used: (1) brine injection, which is injecting brine into muscle tissue with pointed needles, where the brine is water containing dissolved salt and curing substances, as well as additives such as phosphates, spices, sugar, carrageenan and soy proteins; (2) tumbling and massaging, which employ a rotating drum (tumbler) that slowly moves the meat inside, and which can include steel paddles inside to produce a mechanical massaging effect on the meat; (3) vacuum packaging, in which the meat is placed into a vacuum bag, air is removed from the bag, and the vacuum bag is sealed, either with or without gas flushing by injecting gas mixtures that inhibit bacterial growth after removing the air; (4) mixing and blending, in which the meat product and spices are blended in a mixer having a vessel with a rectangular or round bottom and two parallel shafts with paddles that mechanically mix the meat; and (5) emulsification, for fine meat emulsions, in which an emulsifier having a perforated plate is attached to a rotor blade, and a centrifugal pump forces the pre-ground meat through the perforated plate.

Since many foods, especially protein-based foods such as meats, poultry and fish, contain a large percentage of water, a hydrophobic agent applied on or into a protein-based food generally will not diffuse into the food quickly or evenly, since the hydrophobic agent does not readily mix with the water phase in the food. Adding a sufficient amount of a surfactant, such as an emulsifier, can allow a hydrophobic agent to disperse stably in a water phase; however, the addition of surfactants increases costs, and can affect the texture and the taste of the food.

Freezer burn, which can affect nearly any type of food, is another problem that affects the quality, taste, and texture of the food, decreases consumer appeal, and causes loss of economic value. For example, red meats, pork, poultry and fish, can develop freezer burn that appears as spots on the food surface where the food has become dehydrated. The primary mechanism of freezer burn is sublimation. When food is frozen, water molecules in the food form ice crystals. If the air that is adjacent to these ice crystals is cold enough and dry enough, the water molecules that formed the ice crystals in the food escape directly into the air by the process of sublimation. This dehydrates the food, causing the food to dry, shrivel, and appear "burned" at the spot. Freezer burn can also impart an unpleasant flavor and texture to the food, further decreasing consumer appeal, and value.

Thus, what are needed are submicron dispersions of hydrophobic agent particles that are substantially surfactant-free. What are further needed are submicron dispersions with an average particle size larger than 100 nm in diameter. What are additionally needed are dispersions that remain stable when diluted in aqueous fluid, which can be more flexibly employed in a food preparation process. What is needed is a dispersion concentrate that can be used in the same manner in a laboratory preparation, by an end user, or in a commercially-scaled preparation. What is needed is a dispersion concentrate that can be readily used in a beverage. What are needed are submicron dispersions of hydrophobic agent particles that are reproducible, and reproducibly employed if formed from a given mixture of hydrophobic agent(s) to a certain particle size specification. What are further needed are dispersions that can be made with at most limited heating. What is needed are foods combined with a submicron dispersion of hydrophobic agent, including those having improved texture, taste, nutritional value, odor, appearance, ease of preparation, and/or cost of production. Also needed is a dispersion that can be applied into or onto a food to prevent freezer burn.

SUMMARY OF THE DISCLOSURE

The present disclosure provides a composition having an oil-in-water dispersion with enhanced stability. The oil-in-water dispersion can be applied into or onto a food and/or a beverage to enhance the physical, chemical, nutritional, and/or sensory properties of the food or beverage, and also to prevent freezer burn.

The present disclosure provides that the composition has an oil phase with particles of a hydrophobic agent and an aqueous phase with water and/or a water-miscible or a water-soluble substance that are combined and subjected to a mechanical process to form the oil-in-water dispersion.

The particles of the hydrophobic agent in the oil-in-water dispersion have a small negative surface charge that is imparted by the mechanical process. The small negative charge causes the particles to repel each other with a force of repulsion that exceeds a coalescing force and thereby enhances the stability of the oil-in-water dispersion. Increasing the weight-percentage (wt %) of particles of the hydrophobic agent that are over an electrostatic barrier where force of repulsion exceeds force of coalescence, further enhances the stability of the dispersion.

The present disclosure further provides that the particles of the hydrophobic agent in the oil-in-water dispersion have an average particle size that is between about 100 nm to about 999 nm. About 75 wt % to about 100 wt % of the particles of the hydrophobic agent have a particle size that is ±300 nm of the average particle size.

The dispersion used in the composition of the present disclosure can be processed until most or all particles of the hydrophobic agent(s) are sufficiently small and monodispersed to be on the side of a dispersity barrier, where a sufficient quantity of the particles are at their smallest size (critical or terminal particle size) to minimize the risk of sedimentation or creaming, and to make the dispersion stable for commercial applications. The dispersity barrier is a different value for each hydrophobic agent, and depends on the physical and chemical properties of the hydrophobic agent.

The present disclosure still further provides that the oil-in-water dispersion has a polydispersity of 0.25 or less, which enhances the stability of the dispersion. The dispersion becomes more stable as the dispersion approaches monodispersity of the particles around the smallest submicron average particle size and where the wt % of particles over the dispersity barrier increases.

The present disclosure provides that pre-processing the combined oil phase and water phase before the mechanical process improves the efficiency of the mechanical process to form the oil-in-water dispersion and increases monodispersity and wt % of particles about the desired average particle size.

The present disclosure also provides a method of using a composition having an oil-in-water dispersion in a food or a beverage, as disclosed above. The small average particle size, monodispersity, and force of repulsion of the particles of the hydrophobic agent in the dispersion increases the extent of penetration and accelerates diffusion throughout the water phase of a substrate of the food, producing a "bloom" effect that enhances the physical, chemical, nutritional and/or sensory property of a food or a beverage.

The present disclosure provides an embodiment that is a dispersion for use in enhancing a food product, comprising: a dispersion of particles of edible hydrophobic agent(s) in an aqueous fluid, wherein the average particle size of the dispersion is 100 to 999 nm, and wherein the edible hydrophobic agent(s) of the dispersion comprise about 0.01 wt % to about 70 wt % of the dispersion.

In another embodiment, the present disclosure provides an enhanced food comprising a food contacted with a dispersion of particles of edible hydrophobic agent(s) in an aqueous fluid, wherein the average particle size of the dispersion is 100 to 999 nm, and wherein the edible hydrophobic agent(s) of the dispersion comprise about 0.01 wt % to about 70 wt % of the dispersion.

In still another embodiment, the present disclosure provides a method of enhancing food comprising contacting the food with a dispersion of particles of edible hydrophobic agent(s) in an aqueous fluid, wherein the average particle size of the dispersion is 100 to 999 nm, and wherein the edible hydrophobic agent(s) of the dispersion comprise about 0.01 wt % to about 70 wt % of the dispersion.

DETAILED DESCRIPTION OF THE DISCLOSURE

The present disclosure provides a composition having an oil-in-water dispersion with enhanced stability. The oil-in-water dispersion can be applied into or onto a food and/or a beverage to enhance the physical, chemical, nutritional, and/or sensory properties of the food or beverage, and also to prevent freezer burn.

The present disclosure provides that the composition has an oil phase with particles of a hydrophobic agent and an aqueous phase with water and/or a water-miscible or water-soluble substance that are combined and subjected to a mechanical process to form the oil-in-water dispersion having particles of the hydrophobic agent with a small negative surface charge imparted by the mechanical process.

The small negative charge causes the particles to repel each other with a force of repulsion that exceeds a coalescing force and thereby enhances the stability of the oil-in-water dispersion. Increasing the weight-percentage (wt %) the particles of the hydrophobic agent over an electrostatic barrier, where force of repulsion exceeds force of coalescence among the particles in the dispersion, further enhances the stability of the oil-in-water dispersion.

The present disclosure further provides that the particles of the hydrophobic agent in the oil-in-water dispersion have an average particle size that is between about 100 nm to about 999 nm, and about 75 wt % to about 100 wt % of the particles of the hydrophobic agent have a particle size that is ±300 nm of the average particle size.

The present disclosure still further provides that the oil-in-water dispersion has a polydispersity of 0.25 or less to enhance stability. Stability increases further as the distribution of particles in the dispersion approaches monodispersity and as the wt % of particles over the dispersity barrier increases.

The present disclosure provides that pre-processing the combined oil phase and water phase before the mechanical process improves the efficiency of the mechanical process to form the oil-in-water dispersion and increases monodispersity and wt % of particles about the desired average particle size.

The present disclosure also provides a method of using a composition having an oil-in-water dispersion as disclosed above. The small average particle size, monodispersity, and force of repulsion of the particles of the hydrophobic agent in the dispersion increases the extent of penetration, and accelerates diffusion throughout the water phase of a substrate of the food, producing a "bloom" effect to enhance a physical, chemical, nutritional and/or sensory property of a food or a beverage.

The composition of the present disclosure, when applied into or onto the food, also provides an even (uniform) distribution of lipids, oils, flavorants, nutrients, and/or colorants throughout the substrate of the food.

The composition can also be applied into or onto a food to prevent freezer burn.

The composition includes a dispersion having a continuous phase that is a water phase or water-miscible phase and may contain water-soluble agents, and a dispersed phase that is an oil phase.

In an embodiment of the composition of the present disclosure, the dispersion has a dispersed phase containing particles of an edible hydrophobic agent, which is dispersed in a continuous phase that is water or a water-miscible liquid and may contain water-soluble agents, to form a dispersion of submicron particles of the hydrophobic agent having an average particle size from about 100 nm to about 999 nm.

The composition of the present disclosure improve the taste of a food or a beverage because the submicron particles of hydrophobic agents in the dispersion (e.g., oils, fats, and flavorants) spread better on the tongue, and contact more taste receptors on the tongue and smell receptors in the nasal tracts.

The direct or surfactant-mediated application of a hydrophobic material to the surface of a solid food may not allow the material to diffuse adequately into the substrate to provide a desired level of benefit. Further, it is very difficult to incorporate hydrophobic material into flour or other similar powdered substrates as the hydrophobic material is coated with the powder making it very difficult to mix uniformly into the system without high energy. The current formulation adds hydrophobic material concurrently in an intimately and uniformly mixed composition.

The dispersion of hydrophobic material of the present disclosure is formed mechanically, instead of with surfactants. As such, the dispersion can be formed simply of materials found abundantly in organic or naturally derived food.

A "hydrophobic agent" as used in this application, is a compound having little or no solubility in water. More specifically, a hydrophobic agent has a solubility of less than about 0.1% by weight in water. Generally, the dielectric constant of a material provides a rough measure of a material's polarity. The strong polarity of water is indicated, at 20° C., by a dielectric constant of 80.10. Materials with a dielectric constant of less than 15 are generally considered to be non-polar. The hydrophobic agents used in the compositions of this disclosure are non-polar (or substantially non-polar). Examples of hydrophobic agents that can be used in the compositions of the present disclosure are disclosed below.

Generally vapor pressure is a measure of the volatility of a material at 20° C. as compared with water whose vapor pressure is 2.3 kPa. Hydrophobic agents of the present disclosure with a vapor pressure less than that of water are considered to be non-volatile. In embodiments, the "hydrophobic agent" component(s) are substantially non-volatile, in that 75 wt % or more are non-volatile. In embodiments 95 wt % or 99 wt % or more of the hydrophobic agent component(s) are non-volatile.

A composition is "substantially surfactant-free" or "substantially free of surfactant" when (a) the amount of surfactant is not sufficient to materially lower the surface tension of an aqueous fluid, except that amphiphilic compounds with a CMC of $10^{-8}$ mol/L or lower can be present in amounts of 1 part weight to 5 parts weight of other hydrophobic agents, or less. In embodiments, the submicron dispersions of hydrophobic agent particles are substantially free of surfactants, the weight ratio of hydrophobic agent(s) to surfactant molecules(s) other than amphiphilic compounds with a CMC of $10^{-8}$ mol/L or lower is 10 or more. In embodiments, the ratio is 100 or 200 or 500 or 1000 or more. Such minor amounts of surfactants can be composed of anionic, cationic, or non-ionic surfactant molecules.

An "aqueous fluid" as used in this application contains 50 wt % water or more, and 0-50% solutes and water miscible solvents, such as in embodiments 75 wt % water or more, and 0-25% solutes and water miscible solvents.

An "edible" material as used in this application is one that is generally recognized as safe for human or animal consumption.

"Particles" of hydrophobic agents, as used in this application, are colloidal droplets of hydrophobic agents. At some temperature between about 20° C. to about 90° C. the droplets would be liquid.

"Submicron particles" of hydrophobic agents, as used in this application, generally refer to particles having an average particle size from about 100 nm to about 999 nm.

In a preferred embodiment, the oil-in-water dispersion used in the composition contains monodisperse particles of the hydrophobic agent(s) having an average particle size between about 100 nm to about 999 nm.

"Submicron dispersion" as used in this application, is a suspension of hydrophobic agent particles in an aqueous fluid with an average particle size of from 100 nm to 999 nm. In embodiments of the invention, 75% or more, or 80% or more, of the hydrophobic agent particles by volume have a size within 300 nm of the average particle size. In embodiments of the invention, 85% or more, or 90% or more, of the hydrophobic agent particles by volume have a size within 200 nm of the average particle size. In embodiments of the invention, 85% or more, or 90% or more, of the hydrophobic agent particles by volume have a size within 150 nm of the average particle size. The hydrophobic agent particles are not included in the water-solvent-solute weight percentages. The submicron dispersion can be as produced by the processes described herein, or as concentrated therefrom, or as diluted therefrom.

The submicron dispersions of hydrophobic agent particles can be "contacted" with a food. The meaning of "contacted" will be understood by those of skill in the art, and includes being applied into or onto the food using any commercially-viable process.

"Monodispersity" (also called "unidispersity" without a change in meaning), as used in this application, means that most or all of the submicron particles of the hydrophobic agent have a size that is within a relatively narrow range of a single value that represents an average particle size (or mean particle size). When illustrated on a graph of particle size (X-axis) and numbers of particles (Y-axis), monodispersed dispersion appears as a single Gaussian curve that is approximately centered on the value for the average particle size, and having a relatively narrow width.

Conversely, "polydispersity," as used in this application, indicates that there is more than one Gaussian curve of particle sizes. An example of a dispersion having polydispersity would be that 60 wt % of the particles are about 200 nm, 20 wt % are about 500 nm, and the remaining 20 wt % are about 900 nm.

The average particle size, as well as the size of the standard deviation of the surrounding particle sizes, will differ for each hydrophobic agent, and depends on the particular chemical structure and physical properties of the hydrophobic agent. For example, a dispersion of a hydrophobic agent that is coconut oil triglycerides has a mean particle size of 196.4 nm, as measured by a Malvern ZetaSizer particle size analyzer (Malvern Instruments Ltd., Malvern, UK) when prepared by the process disclosed in this application. In general, hydrophobic agent that are vegetable oils or other cooking oils, when prepared by the process disclosed in this application, typically have an average particle size between about 150 to about 300 nm, with a relatively tight particle size distribution.

The present disclosure provides a composition having an oil-in-water dispersion with enhanced stability. The composition includes an oil phase comprising particles of a hydrophobic agent(s), and an aqueous phase comprising water and/or a water-miscible substance. The oil phase and the aqueous phase are combined and subjected to a mechanical process to form an oil-in-water dispersion having particles of the hydrophobic agent(s) with a small negative surface charge imparted by the mechanical process. The particles of the hydrophobic agent(s) in the oil-in-water dispersion have a polydispersity of 0.25 or less. The particles of the hydrophobic agent(s) in the oil-in-water dispersion have an average particle size of about 100 nm to about 999 nm in diameter. About 75 weight-% (wt %) to about 100 wt % of the particles of the hydrophobic agent(s) in the oil-in-water dispersion have a particle size that is ±300 nm of the average particle size of the hydrophobic agent(s). The small negative surface charge imparted to the hydrophobic particles by the mechanical process causes the particles of the hydrophobic agent(s) to repel each other with a force of repulsion such that the force of repulsion exceeds a force of coalescence among the particles of the hydrophobic agent(s), thereby enhancing stability of the oil-in-water dispersion by preventing aggregation of the particles of the hydrophobic agent(s).

The dispersion of the present disclosure can be produced by mixing an aqueous fluid and hydrophobic agents using processing conditions known in the art including, but not limited, to sonication (Sonic Man, Matrical Bioscience, Spokane, Wash.), high pressure/high shear (e.g., utilizing Microfluidizer, Microfluidics Company, Newton, Mass.), freeze drying (Biochimica Biophys. Acta 1061:297-303 (1991)), reverse phase evaporation (Microencapsulation 16:251-256 (1999)), and bubble method (J. Pharm. Sci. 83(3):276-280 (1994)).

In sonication, for example, high intensity sound waves bombard the product for predetermined period of time. In direct sonication, the sonication probe is directly applied into the composition for processing. In indirect sonication, the composition is immersed into an ultrasonic bath, where it is exposed to the processing conditions for a predetermined period of time.

Precipitation utilizes compounds that are poorly-soluble in water, but soluble in organic solvents and surfactants that are water-soluble, to create emulsions. Two separate solutions are formed, one of an organic solvent and compounds, the other a mixture of surfactant dissolved in water. The two solutions are combined and an emulsion is created. The organic solvent is then evaporated out of the emulsion, causing the small spherical particles to precipitate, creating a suspension of submicron micelles.

High pressure/high shear utilizes an aqueous phase and a hydrophobic phase, and elastic or substantially elastic collisions. The aqueous phase is prepared into a solution and any other water-soluble or water miscible components are optionally added. The hydrophobic phase is prepared into a mixture with any other non-water miscible or non-water soluble components. The two phases are pre-combined and then subjected to pressure ranging from 10,000-50,000 psi. The composition contains submicron particles.

In freeze drying, two available methods are thin film freezing and spray freeze drying. In spray freeze drying, for example, an aqueous solution containing active ingredients is atomized into the cold gas above a cryogenic liquid. The atomized particles adsorb onto the gas-liquid interface and aggregate there as submicron micelles.

Standard operating conditions are defined herein as 0-4% amphiphile, preferably 0.5-2% amphiphile, and 10,000-25,000 psi.

In an exemplary embodiment, the oil-in-water dispersion used in the composition is a monodispersed dispersion of submicron particles of the hydrophobic agent(s) in which at least 75 wt % of the total particles in the dispersion are ±300 nm of the value for the average particle size, more preferably are ±250 nm, and still more preferably are ±200 nm, ±150 nm, and ±100 nm, respectively, of the value for the average particle size. In another embodiment, at least 75 wt % of the total particles in the dispersion are ±2 standard deviations of the value for the average particle size, more preferably are ±1.50 standard deviations of the value for the average particle size, and most preferably are ±1 standard deviation of the value for the average particle size.

In another exemplary embodiment, the process of the present disclosure will produce a monodispersed dispersion of submicron particles of the hydrophobic agent(s) in which at least 80 wt % of the total particles in the dispersion are ±300 nm of the value for the average particle size, more preferably are ±250 nm, and still more preferably are ±200 nm, ±150 nm, and ±100 nm, respectively, of the value for the average particle size. In another embodiment, at least 80 wt % of the total particles in the dispersion are ±2 standard deviations of the value for the average particle size, more preferably are ±1.50 standard deviations of the value for the average particle size, and most preferably are ±1 standard deviation of the value for the average particle size.

In yet another exemplary embodiment, the process of the present disclosure will produce a monodispersed dispersion of submicron particles of the hydrophobic agent(s) in which at least 85 wt % of the total particles in the dispersion are ±300 nm of the value for the average particle size, more preferably are ±250 nm, and still more preferably are ±200 nm, ±150 nm, and ±100 nm, respectively, of the value for the average particle size. In another embodiment, at least 85 wt % of the total particles in the dispersion are ±2 standard deviations of the value for the average particle size, more preferably are ±1.50 standard deviations of the value for the average particle size, and most preferably are ±1 standard deviation of the value for the average particle size.

In yet another exemplary embodiment, the process of the present disclosure will produce a monodispersed dispersion of submicron particles of the hydrophobic agent(s) in which at least 90 wt % of the total particles in the dispersion are ±300 nm of the value for the average particle size, more preferably are ±250 nm, and still more preferably are ±200 nm, ±150 nm, and ±100 nm, respectively, of the value for the average particle size. In another embodiment, at least 90 wt % of the total particles in the dispersion are ±2 standard deviations of the value for the average particle size, more preferably are ±1.50 standard deviations of the value for the average particle size, and most preferably are ±1 standard deviation of the value for the average particle size.

In another exemplary embodiment, the process of the present disclosure will produce a monodispersed dispersion of submicron particles of the hydrophobic agent(s) in which at least 95 wt % of the total particles in the dispersion are ±300 nm of the value for the average particle size, more preferably are ±250 nm, and still more preferably are ±200 nm, ±150 nm, and ±100 nm, respectively, of the value for the average particle size. In another embodiment, at least 95 wt % of the total particles in the dispersion are ±2 standard deviations of the value for the average particle size, more preferably are ±1.50 standard deviations of the value for the average particle size, and most preferably are ±1 standard deviation of the value for the average particle size.

Figure 2:
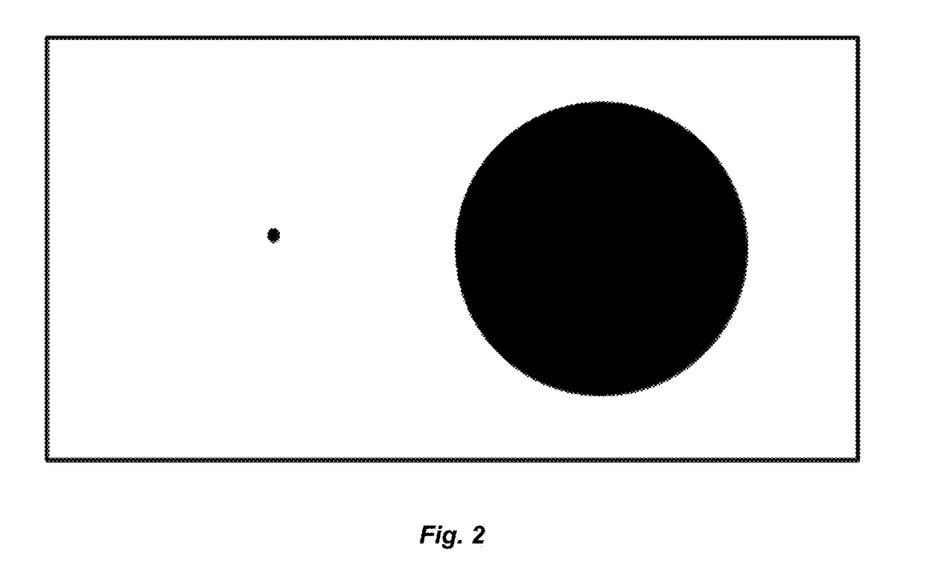
FIG. 2 shows a schematic size comparison of a 150-300 nm particle, as in the present disclosure vs. a 3-5 micron surfactant-based micelle.

The small particle size of the hydrophobic agents after processing imparts stability to the dispersion. The small size of the particles minimizes the coalescing force (e.g., the Van Der Waals force) that would otherwise cause the particles to aggregate and thereby decreases stability of the dispersion. For each of the embodiments above, the smaller the standard deviation of the particles from the average particle size, the greater the stability of the dispersion. FIG. 2 shows a schematic size comparison of a 150-300 nm particle of the present disclosure vs. a 3-5 micron surfactant-based micelle. In addition, a rheological modifying agent can optionally be added to the dispersion to further enhance the long-term stability of the dispersion. Examples of rheological agents that can be used with the compositions of the present disclosure are provided below.

Stability of the dispersions refers to the ability to remain dispersed over a period of time. For example, the period of time can be 1 hour, 1 day, 2 weeks, one month, 3 months, 6 months, one year, or more, and any subranges therebetween depending upon the application. As an example, 180 days or more of stability provided by the dispersions disclosed herein provides a sufficient period of time in which the composition can be applied to a food or beverage.

In an embodiment, each submicron particle of the hydrophobic agent(s) in the oil-in-water dispersion possesses a small negative charge. The negative charge causes the submicron particles to repulse each other. This slight repulsion force causes the submicron particles to attempt to move away from each other, to create the largest possible distance between them, and generally filling the entire available volume.

The negative charge in a dispersion is measurable and quantifiable. In an exemplary embodiment of the present disclosure, the net negative charge of the particles of the hydrophobic agent in the oil-in-water dispersion is −30 mV or lower (i.e., more negative).

The zeta potential of the dispersion is also quantifiable. In an exemplary embodiment of the present disclosure, the oil-in-water dispersion has a zeta potential that is a negative value.

The composition of the present disclosure has an accelerated diffusion speed and enhanced penetration into and throughout a food, as compared with the ordinary diffusion speed and penetration of the same hydrophobic agent(s) when applied into or onto the same food.

The accelerated diffusion speed and enhanced penetration by compositions of the present disclosure throughout the substrate of a food is attributable to the small (submicron) average particle size of the hydrophobic agent(s) in the composition, which allows the particles to diffuse quickly into crevices throughout the food, plus the small negative charge of the individual submicron particles of the hydrophobic agent(s) (and resulting repulsive forces among those particles), which force the particles to quickly move away from each other. This causes a rapid diffusion, or "bloom," of the submicron particles of the hydrophobic agent(s) into and throughout the food or beverage.

Many foods, for example, but not limited to, protein-based foods such as red meats, pork, poultry, and fish, have large water concentrations throughout their structure, creating a water phase in the food. Hydrophobic agents contained in conventional compositions are often particles having an average size that is greater (and often several times greater) than 1 micron, and do not easily fit into crevices throughout the food product, reducing the extent of penetration as well as reducing the diffusion speed. Also, unless sufficient amounts of surfactants are added, the hydrophobic particles of conventional compositions do not integrate with the water phase in the food and simply float to the surface of the food product, further reducing the diffusion speed.

"Ordinary diffusion" as used in this application, is the speed at which a hydrophobic agent diffuses throughout a food or beverage. "Accelerated diffusion" is the increased speed (as compared with ordinary diffusion) at which the composition of the present disclosure diffuses throughout the same food or beverage, respectively.

The dispersion used in the composition of the present disclosure can be processed until most or all of the particles of the hydrophobic agent are sufficiently small and monodispersed to be on the side of a dispersity barrier where a sufficient quantity of particles are at their (critical or terminal particle size) to minimize the risk of sedimentation or creaming and to make the dispersion stable for commercial applications.

"Electrostatic barrier," as used in this application, means the value at which repulsion forces are equal to coalescing forces for the particles in the dispersion.

The portion (or alternatively, the ratio) of particles that are "over" the electrostatic barrier (i.e., the point at which repulsion forces exceed the coalescing forces in the dispersion), in relation to the total number of particles, is a measure of the stability and quality of the dispersion.

The dispersity barrier has a different value for each hydrophobic agent, and depends on the physical and chemical properties of the hydrophobic agent.

In an exemplary embodiment, at least 10 wt % of the total hydrophobic particles in the dispersion are over the dispersity barrier (meaning that sufficient a sufficient number of particles at size to minimize the risk of sedimentation or creaming for a commercially viable period of time). In another preferred embodiment, 50 wt % or more of the particles are over the dispersity barrier, indicating that the dispersion is more stable relative to the earlier embodiment. In a preferred embodiment, 75 wt % or more of the particles are over the dispersity barrier, indicating that the dispersion is even more stable. In increasingly preferred embodiments, 85 wt % or more, 90 wt % or more, 95 wt % or more, and 99 wt % or more of the particles of the hydrophobic agent(s) are over the dispersity barrier, respectively, indicating dispersions that are increasingly stable.

In an exemplary embodiment of the composition of the present disclosure, at least 75 wt % of the particles of the hydrophobic agent(s) in the oil-in-water dispersion are distributed as a monodispersity about the average particle size, and at least 75 wt % of the particles of the hydrophobic agent are over the dispersity barrier.

In a preferred embodiment of the composition of the present disclosure, at least 90 wt % of the particles of the hydrophobic agent in the oil-in-water dispersion are distributed as a monodispersity about the average particle size, and at least 90 wt % of the particles of the hydrophobic agent are over the dispersity barrier.

Freezer burn, which can affect any of the food products in this application, including, but not limited to, meats (beef and pork), poultry, and fish, usually appears as spots on the surface of the food which have become dehydrated. As noted above, freezer burn is primarily caused by sublimation. When food is frozen, water molecules in the food form ice crystals that escape directly into the air adjacent to the ice crystals by sublimation, provided the air is cold, and dry enough. Freezer burn dehydrates the food, and causes the food to dry, shrivel, and appear burned at that spot. Freezer burn can also impart an unpleasant flavor and texture to the food, decreasing consumer appeal and value.

Applying the composition of the present disclosure to a food is observed to decrease and even prevent freezer burn. This may be due to the accelerated diffusion and complete penetration of the submicron particles of the hydrophobic agent(s) throughout the entire piece of the meat, poultry, and fish, including into the crevices in the food, providing a thin moisture barrier that preventing sublimation of ice crystals from the surface of the food that cause freezer burn.

Fish are often prepared and iced down on the boat within minutes of being caught. Once the boat has returned to land, the frozen fish are passed through water, and then passed through oil to enhance flavor and texture. However, when conventional compositions containing oils are used, a frozen fish uptakes only a small amount of the oil (about 4%). Also, penetration of oil into the fish is largely confined to the surface of the fish where the ice has slightly melted, because the water phase inside the fish remains solid (ice).

However, using the composition of the present disclosure having a dispersion of submicron, monodispersed particles of a hydrophobic agent (i.e., oil), the fish uptakes about 6 to 8% of the oil, which is increased to nearly two times the uptake of oil by a fish as compared with conventional oil compositions.

In addition to increased uptake of oil, applying the composition of the present disclosure to a fish has the benefit of preventing freezer burn to the surface of the fish.

"Water-miscible," as used in this application, means that the substance is infinitely soluble in water at any ratio.

The composition of the present disclosure can be applied into or onto the food by one or more food processing methods. Examples of conventional food processing methods used for meats include, but are not limited to, injection, tumbling, massaging, vacuum packaging, mixing, blending, emulsification, and any combinations thereof.

In an exemplary embodiment, the composition of the present disclosure has a dispersion that is made by the following process. A water phase is prepared. The water phase can be water or a combination of water and a water-soluble or water-miscible substance. Optionally, a freezing point suppressant can be added to the water phase. Examples of a freezing point suppressant include, but are not limited to, glycerin, glycol, and any combinations thereof. In addition, a preservative can optionally be added to the water phase, to prevent microbial contamination. However, the preservative and the freezing point suppressant are not necessary for the production of the dispersion.

The oil phase is prepared separately. The oil phase contains one or more hydrophobic agent(s), examples of which are disclosed, but not limited to the examples below. Different combinations of processing can be employed. For example, there can be additional homogenization steps, temperature alteration, or hydrophobic agents that can increase solubility.

The composition of the present disclosure can further include an initiator. The initiator can be added to the mixture of the water phase and the oil phase.

In a preferred embodiment, the initiator is an amphiphilic compound. As noted above, the amphiphilic compound can have a Critical Micelle Concentration (CMC) of $10^{-8}$ mol/L or lower. In a more preferred embodiment, the amphiphilic compound is a phospholipid.

"Amphiphile," "amphiphilic compound," and "amphiphilic agent," as used interchangeably in this application, mean a compound that, when used in the process in this disclosure, yields a dispersion having an average particle size that is always greater than about 100 nm, when the standard energy contribution of the process is imparted to the dispersion.

In an exemplary embodiment, the average particle size is less than about 20 μm (20 microns) and relatively homogeneous; for example, a particle distribution in which 50 wt % of the particles are less than 20 μm (20 microns) in size. Other parameters that are reviewed include pH, specific gravity, and viscosity. An acceptable particle size distribution where 50 wt % or more of the particles are in a Gaussian distribution; more preferably, 75 wt % or more of the particles are in a Gaussian distribution; and still more preferably, 90 wt % or more of the particles are in a Gaussian distribution.

In a preferred embodiment, pre-processing the combined water phase and oil phase produces a homogenized mixture in which at least 50 wt % of the particles of the hydrophobic agent are below an average particle size of 20 μm, and can have at least 75 wt % of the particles of the hydrophobic agent in a Gaussian distribution.

Alternatively, in another embodiment, the combined water phase and oil produces a homogenized mixture in which at least 90 wt % of the particles of the hydrophobic agent are below an average particle size of 20 μm, and can have at least 75 wt % of the particles of the hydrophobic agent are in a Gaussian distribution.

The oil-in-water dispersion can be subjected to any known process of making small particles to further improve the monodispersity of the particles, and also to increase the wt % of particles of the hydrophobic agent that are over the electrostatic barrier and the dispersity barrier, to further enhance stability of the dispersion.

Once the average particle size and monodispersity are determined to be acceptable for the intended application, the dispersion is used as a composition that can be applied into or onto a food to enhance texture, flavor and taste, nutritional value, tenderizing, and/or uptake of oil throughout the food.

In the dispersions of the present disclosure, the use of a particular initiator and its concentration influence the limits of the average particle size.

Dispersions having an average particle size that is greater than 100 nm have the additional benefit of being regulatory compliant with guidelines that define nanotechnology as particles that are less than 100 nm, i.e., that are smaller than the low end of the average particle size range of the present disclosure.

The submicron dispersions of hydrophobic agent particles can include one or more amphiphilic compounds with a CMC of $10^{-8}$ mol/L or lower. In certain embodiments, examples of these amphiphilic compounds include but are not limited to one or more phospholipids having a net neutral charge at pH 7.4, such as phosphatidylcholine or phosphatidylethanolamine. In certain embodiments, the amphiphilic compound(s) are for example, without limitation, one or more phospholipids having a net negative charge at pH 7.4, such as a phosphatidylinosiitide, phosphatidylglycerol, or phosphatidic acid.

The amount of phospholipid can be from 0.1 wt % or 1 wt % to 15 wt %, as a percentage of the total phospholipid plus hydrophobic agent that is not phospholipid. Such phospholipid can contain either saturated or unsaturated fatty acyl chains. The phospholipids may be subjected to the process of hydrogenation to minimize the level of unsaturation thereby enhancing their resistance to oxidation. Exemplary sources of hydrogenated phosphatidylcholine (lecithin) include, for example, Basis LP20H lecithin (Ikeda Corp., Japan).

In optional embodiments, the submicron dispersions of hydrophobic agent compositions can be substantially free of polymeric encapsulants such as cyclodextrin in that a given submicron dispersion could be prepared with the same average particle size±100 nm using the same composition absent the polymeric encapsulants, and be stable for a commercially viable period of time.

The production process is adapted to obtain hydrophobic particles of the appropriate size. The hydrophobic agent particles of the present disclosure, which are typically mechanically created, differ from the typical micelles whose creation is more dependent on the properties of surface-active agents. The particles of the dispersion of the present disclosure are believed to be stable primarily due to small size, rather than the effects of the surface-active agents. This stability enhancement is defined by Stokes' Law which is illustrated in an equation relating the terminal settling or rising velocity of a smooth sphere in a viscous fluid of known density and viscosity to the diameter of the sphere when subjected to a known force field. This equation is $V=(2 gr^2)(d1-d2)/9\mu$, where V=velocity of fall (cm/sec), g=acceleration of gravity (cm/sec$^2$), r=radius of particle (cm), d1=density of particle (g/cm$^3$), d2=density of medium (g/cm$^3$), and $\mu$=viscosity of the medium (dyne sec/cm$^2$). Using this equation, with all other factors being constant, a 200 nm hydrophobic agent particle has a velocity of fall that is 680 times slower than one of identical composition having a 5 micron particle size of a standard emulsion.

The composition can be produced with a shear that creates in combination with pressure an average particle size of between about 100 nm to about 999 nm, such as between about 100-500 nm, or 150-300 nm. The process can, for example, without limitation, include a rapid return to atmospheric pressure. Embodiments include wherein 85% or more, or 90% or more, of the particles by volume are within one of the above-cited ranges.

Figure 1:
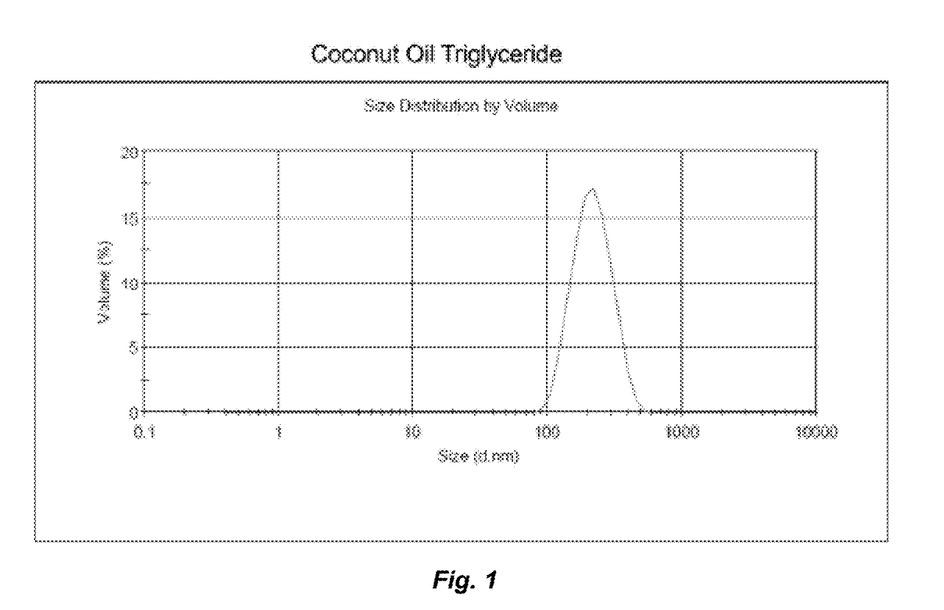
FIG. 1 is a graph showing particle size distribution for a dispersion of coconut oil triglycerides in accordance with some embodiments of the present disclosure.

FIG. 1 shows a size distribution for a dispersion of coconut oil triglycerides as measured by a Malvern Zeta-Sizer particle size analyzer (Malvern Instruments Ltd. Malvern, UK) which was prepared using a Microfluidizer at 15,000-20,000 psi of pressure. This figure indicates that the mean particle size is 196.4 nm. Sizes recited herein are those determined by dynamic light scattering for spectrum analysis of Doppler shifts under Brownian motion. Measurements are made using Mie scattering calculations for spherical particles. This reproducible methodology can be conducted with several other available instruments for measuring average particle size and particle size distribution, including instruments from Microtrac (e.g., Nanotrac instrument, Montgomeryville, Pa.) or Horiba Scientific (Edison, N.J.).

The temperature of operation is generally between about 15° C. and about 30° C. In certain embodiments, the process avoids temperatures in excess of about 50° C., or in excess of about 60° C. However certain embodiments may require a temperature exceeding 60° C. to melt the hydrophobic edible agent.

The dispersion can optionally include a rheological modifying agent. Such agents are known in the art and include, without limitation, those set forth in the following table adapted from www.foodadditives.org/food_gums/common.html:

TABLE

| Rheological Modifying Agents |
| --- |
| Agar-agar - a gum consisting of two repeating units of polysaccharides: alpha-D-galactopyranosyl and 3,6-anhydro-alpha-L-galactopyranosyl derived from red seaweed. Traditional agar-agar can bind approximately 100 times its weight in water when boiled, forming a strong gel that is often used as a stabilizer or thickener. A recent application of agar-agar is replacing gelatin as the gelling agent in dairy products, such as yogurt. Agar-agar is a non-animal gel source which is suitable for vegetarians and people with religious dietary restrictions (Kosher/Halal). |

| TABLE-continued |
|---|
| Rheological Modifying Agents |

Alginate - is a polysaccharide, like starch and cellulose, and is derived from brown seaweed. Alginate provides properties in processed foods and beverages such as gelling, viscosifying, suspending, and stabilizing. Alginate gelling may be achieved using calcium under controlled conditions. It employs the combination of alginate, a slowly soluble calcium salt, and a suitable calcium sequestrant, such as a phosphate or citrate. The process may be performed at neutral or acid pH.

Carrageenan - a water soluble gum derived from red seaweeds, such as Eucheuma, Gigartina, and Chondrus. Carrageenan is a sulfated linear polysaccharide of D-galactose and it has a strong negative charge, thereby allowing it to stabilize gels or act as a thickener. Carrageenan is found in numerous products, ranging from toothpaste to soy milk. It is used to suspend cocoa solids in beverages, for example, and can be used in meats to reduce cooking losses.

Cassia Gum - is a naturally occurring galactomannan found in the endosperm of cassia tora and obtusifolia seeds. It is an effective thickener and stabilizer for a broad range of food applications. Cassia gum has excellent retort stability and forms strong synergistic gels with other hydrocolloids including carrageenan and xanthan gum. Human food grade cassia gum is specially processed to meet rigorous purity standards.

Cellulose Gum - Carboxymethyl Cellulose (CMC), or cellulose gum is an abundant and natural polysaccharide found in all plants. Cellulose gum is a water-soluble gum that is based on cellulose. Cellulose gum has been used in food products for over 50 years as a thickener and stabilizer. Typical uses are in instant beverages, baked goods, and ice-cream.

Gellan Gum - a food gum that is primarily used as a gelling or thickening agent. It can be used in fortified beverages to suspend protein, minerals, vitamins, fiber, and pulp. Gellan gum also suspends milk solids in diluted milk drinks. Gellan gum can act as a fluid gel, having a wide range of textures, and can exist as a light pourable gel or a thick, spreadable paste. Gellan gum is a non-animal gel source which is suitable for vegetarians and people with religious dietary restrictions (Kosher/Halal).

Guar Gum - a carbohydrate consisting of mannose and galactose at a 2:1 ratio that can swell in cold water. Guar gum is one of the most highly efficient water-thickening agents available to the food industry and is widely used as a binder and volume enhancer. Its high percentage of soluble dietary fiber (80 to 85%) means that it is often added to bread to increase its soluble dietary fiber content. Guar gum is also commonly used to thicken and stabilize salad dressings and sauces and help improve moisture retention in finished baked goods.

Hydroxypropyl cellulose - cellulose is an abundant and natural polysaccharide found in all plants. Hydroxypropyl cellulose is based on cellulose and is used in many food products to provide good foam stability. Hydroxypropyl cellulose is commonly found in whipped toppings where it stabilizes the foam and provides a long lasting whipped topping with dairy-like eating quality.

Konjac Gum - a polysaccharide from a plant known as elephant yam, which is commonly found in Asia. This gum can be used as a vegan substitute for gelatin and other thickeners. Its texture makes it ideal for jellies because of its high viscosity.

Locust Bean Gum - also called Carob bean gum, locust bean gum is derived from the seeds of the carob bean. Locust bean gum is used for thickening, water-binding, and gel strengthening in a variety of foods. It has synergistic interactions with other gums, such as xanthan or carrageenan, and can be used in applications such as dairy, processed cream cheese, and dessert gels.

Methylcellulose and Hydroxypropyl Methylcellulose - cellulose is an abundant and natural polysaccharide found in all plants. Methylcellulose and hydroxypropyl methylcellulose are based on cellulose and are used in many food products to provide texture, certain mouth feels, and other desirable qualities. These gums are commonly found in soy burgers where they add meat-like texture to the vegetable proteins, in fried appetizers like mozzarella cheese sticks and onion rings where they create firm texture by reducing the uptake of frying oils, and in whipped toppings where they stabilize the foam structure to give long lasting creams.

Microcrystalline cellulose (MCC) - is a polysaccharide derived from naturally occurring cellulose similar to that found in fruits and vegetables. MCC can be used as a bulking agent, source of fiber and moisture regulator in processed foods. MCC may also be co-processed with carboxymethyl cellulose (CMC) to impart shear-thinning and heat stable properties. Additional properties in food and beverages from MCC/CMC co-processed products include gelling, viscosifying, suspending, and stabilizing.

Pectin - a polysaccharide derived from plant material, mainly citrus fruit peels, apple peels, or sugar beets. Pectin is widely used to impart gel formation, thickening, and physical stability to a wide range of foods. It is mostly used in fruit-based products, including jams, jellies, confectioneries, and fruit drinks, but is also used in dairy applications such as drinking and spoonable yogurt.

Xanthan Gum - a highly branched polysaccharide of D-glucose, D-mannose, and D-glucuronic acid produced via bacterial fermentation using nutrient sources. Xanthan gum, which is considered natural, is an excellent emulsion stabilizer in salad dressings and sauces and also is used in bakery fillings to prevent water migration from the filling to the pastry (which has strong water-binding properties). Xanthan gum can often be used to improve the shelf life of a product.

The rheological modifying agent can be present in an amount from 0 wt % to 15 wt %, or 0 wt % to 10 wt %, or 0 wt % to 5 wt %, or 0 wt % to 2 wt %, or from 0.01 wt % to 15 wt %, or 0.01 wt % to 10 wt %, or 0.01 wt % to 5 wt %, or 0.01 wt % to 2 wt %. Rheological modifying agents are added in particular to help immobilize the particles of edible hydrophobic agents for still longer term stability of the submicron dispersions.

Examples of hydrophobic agents that can be used in the dispersions of the present disclosure include, but are not limited to, mono-, di-, tri-, or poly-alkyl (or alkenyl) esters or ethers of a di-, tri-, or poly-hydroxy compound, such as glycerin, sorbitol or other polyol compound. Examples of the esters or ethers include, but are not limited to, saturated and unsaturated, linear and branched vegetable oils, such as soybean oil, almond oil, castor oil, canola oil, cottonseed oil, grapeseed oil, rapeseed oil, rice bran oil, palm oil, coconut oil, palm kernel oil, olive oil, linseed oil, sunflower oil, safflower oil, peanut oil, and corn oil. Saturated and unsaturated oils that can be used in the dispersion include those having 90% or more (molar) fatty acyl components with 6 to 30 carbon atoms, preferably 6 to 24 carbon atoms, and more preferably 12 to 24 carbon atoms.

Examples of fatty acids providing fatty acyl components, or which provide hydrophobic agents include, but are not limited to, butyric acid, caproic acid, caprylic acid, capric acid, lauric acid, myristic acid, palmitic acid, palmitoleic acid, stearic acid, oleic acid, ricinoleic acid, vaccenic acid, linoleic acid, α-linoleic acid (ALA), γ-linoleic acid (GLA), arachidic acid, gadoleic acid, arachidonic acid (AA), eicosapentaenoic acid (EPA), behenic acid, erucic acid, docosahexaenoic acid (DHA), lignoceric acid, and any combinations thereof. Additional information about the fatty acids listed above is in the table below:

| Common Name | Carbon Atoms | Double Bonds | Scientific Name | Sources |
|---|---|---|---|---|
| Butyric acid | 4 | 0 | butanoic acid | butterfat |
| Caproic Acid | 6 | 0 | hexanoic acid | butterfat |
| Caprylic Acid | 8 | 0 | octanoic acid | coconut oil |
| Capric Acid | 10 | 0 | decanoic acid | coconut oil |
| Lauric Acid | 12 | 0 | dodecanoic acid | coconut oil |
| Myristic Acid | 14 | 0 | tetradecanoic acid | palm kernel oil |
| Palmitic Acid | 16 | 0 | hexadecanoic acid | palm oil |
| Palmitoleic Acid | 16 | 1 | 9-hexadecenoic acid | animal fats |
| Stearic Acid | 18 | 0 | octadecanoic acid | animal fats |
| Oleic Acid | 18 | 1 | 9-octadecenoic acid | olive oil |
| Ricinoleic acid | 18 | 1 | 12-hydroxy-9-octadecenoic acid | castor oil |
| Vaccenic Acid | 18 | 1 | 11-octadecenoic acid | butterfat |
| Linoleic Acid | 18 | 2 | 9,12-octadecadienoic acid | grape seed oil |
| Alpha-Linolenic Acid (ALA) | 18 | 3 | 9,12,15-octadecatrienoic acid | flaxseed (linseed) oil |
| Gamma-Linolenic Acid (GLA) | 18 | 3 | 6,9,12-octadecatrienoic acid | borage oil |
| Arachidic Acid | 20 | 0 | eicosanoic acid | peanut oil, fish oil |
| Gadoleic Acid | 20 | 1 | 9-eicosenoic acid | fish oil |
| Arachidonic Acid (AA) | 20 | 4 | 5,8,11,14-eicosatetraenoic acid | liver fats |
| EPA | 20 | 5 | 5,8,11,14,17-eicosapentaenoic acid | fish oil |
| Behenic acid | 22 | 0 | docosanoic acid | rapeseed oil |
| Erucic acid | 22 | 1 | 13-docosenoic acid | rapeseed oil |
| DHA | 22 | 6 | 4,7,10,13,16,19-docosahexaenoic acid | fish oil |
| Lignoceric acid | 24 | 0 | tetracosanoic acid | small amounts in most fats |

Examples of oils or fats as sources of the hydrophobic agent used in the dispersions of the present disclosure include, but are not limited to, almond oil, beef tallow, butterfat, canola oil, cocoa butter, cod liver oil, coconut oil, corn oil, cottonseed oil, flaxseed oil, grapeseed oil, illipe oil, lard (pork fat), olive oil, orange oil, palm oil, palm olein, palm kernel oil, peanut oil, peppermint oil, safflower oil, sesame oil, shea nut oil, shea nut butter, soybean oil, sunflower oil, walnut oil, and any combinations thereof. Further information about fatty acyl compositions of some oils useful in the present disclosure are provided in the table below:

Still other hydrophobic agents that can be used in the dispersions of the present disclosure are flavorants including, but not limited to, terpenes, isoterpenes, alkyl lactones, essential oils, vanilla. The hydrophobic agents can be aroma providers that impart aroma or modify aroma of a food product.

Other hydrophobic agents that can be used in the dispersions of the present disclosure are artificial fats, including, but not limited to, olestra (sucrose acylated with up to eight fatty acid groups), polyglycerol fatty acid esters (e.g., $R-(OCH_2-CH(OR)-CH_2O)_n-R$), where R represents one or more fatty acids, and the average value of n is 3.

| Oil or Fat | Unsat./Sat. ratio | Saturated | | | | | Mono unsatur. | Poly unsaturated | |
| | | Capr. Acid C10:0 | Laur. Acid C12:0 | Mryis. Acid C14:0 | Palm. Acid C16:0 | Stear. Acid C18:0 | Oleic Acid C18:1 | Linoleic Acid (ω6) C18:2 | Alpha Linoleic Acid (ω6) C18:3 |
|---|---|---|---|---|---|---|---|---|---|
| Almond Oil | 9.7 | — | — | — | 7 | 2 | 69 | 17 | — |
| Beef Tallow | 0.9 | — | — | 3 | 24 | 19 | 43 | 3 | 1 |
| Butterfat (cow) | 0.5 | 3 | 3 | 11 | 27 | 12 | 29 | 2 | 1 |
| Butterfat (goat) | 0.5 | 7 | 3 | 9 | 25 | 12 | 27 | 3 | 1 |
| Butterfat (human) | 1.0 | 2 | 5 | 8 | 25 | 8 | 35 | 9 | 1 |
| Canola Oil | 15.7 | — | — | — | 4 | 2 | 62 | 22 | 10 |
| Cocoa Butter | 0.6 | — | — | — | 25 | 38 | 32 | 3 | — |
| Cod Liver Oil | 2.9 | — | — | 8 | 17 | — | 22 | 5 | — |
| Coconut Oil | 0.1 | 6 | 47 | 18 | 9 | 3 | 6 | 2 | — |
| Corn Oil (Maize Oil) | 6.7 | — | — | — | 11 | 2 | 28 | 58 | 1 |
| Cottonseed Oil | 2.8 | — | — | 1 | 22 | 3 | 19 | 54 | 1 |
| Flaxseed Oil | 9.0 | — | — | — | 3 | 7 | 21 | 16 | 53 |
| Grape seed Oil | 7.3 | — | — | — | 8 | 4 | 15 | 73 | — |
| Illipe | 0.6 | — | — | — | 17 | 45 | 35 | 1 | — |
| Lard (Pork fat) | 1.2 | — | — | 2 | 26 | 14 | 44 | 10 | — |
| Olive Oil | 4.6 | — | — | — | 13 | 3 | 71 | 10 | 1 |
| Palm Oil | 1.0 | — | — | 1 | 45 | 4 | 40 | 10 | — |
| Palm Olein | 1.3 | — | — | 1 | 37 | 4 | 46 | 11 | — |
| Palm Kernel Oil | 0.2 | 4 | 48 | 16 | 8 | 3 | 15 | 2 | — |
| Peanut Oil | 4.0 | — | — | — | 11 | 2 | 48 | 32 | — |
| Safflower Oil* | 10.1 | — | — | — | 7 | 2 | 13 | 78 | — |
| Sesame Oil | 6.6 | — | — | — | 9 | 4 | 41 | 45 | — |
| Shea nut | 1.1 | — | 1 | — | 4 | 39 | 44 | 5 | — |
| Soybean Oil | 5.7 | — | — | — | 11 | 4 | 24 | 54 | 7 |
| Sunflower Oil* | 7.3 | — | — | — | 7 | 5 | 19 | 68 | 1 |
| Walnut Oil | 5.3 | — | — | — | 11 | 5 | 28 | 51 | 5 |

*Not high-oleic variety

In embodiments, embodiments, without limitation, about 51 wt % or more of the edible hydrophobic agent(s) are one or more of the oils identified above. In embodiments, without limitation, about 51 wt % or more of the edible hydrophobic agent(s) are canola oil, corn oil, cottonseed oil, flaxseed oil, grape seed oil, peanut oil, safflower oil, sesame oil, soybean oil, sunflower oil, walnut oil, olive oil, peppermint oil, orange oil or a mixture thereof.

Still further, the hydrophobic agents used in the dispersions of the present disclosure can be colorants including, but are not limited to, annatto oil, paprika oil, chlorophyll, lycopene, carotenoids, xanthophylls, and combinations thereof.

Yet further, the hydrophobic agents used in the dispersions of the present disclosure include, but are not limited to, nutrients such as Vitamin D, Vitamin A, Vitamin E, Vitamin K, Vitamin F, Vitamin P, any derivatives of these vitamins, lipoic acid, phospholipids, ceramides, ubiqinone, sterols, flavonoids, cholesterol, sphingolipids, prostaglandins, docosahexaenoic acid, and any combinations thereof.

The hydrophobic agents can be present in the composition in an amount of: about 0.01 wt % to about 70 wt %; or about 0.1 wt % to about 70 wt %; or about 5 wt % to about 50 wt %; or about 10 wt % to about 30 wt %.

The dispersions used in the compositions of the present disclosure can be concentrated and can have a high load of hydrophobic agents in the amount of: about 30 wt % to about 70 wt %; or about 40 wt % to about 70 wt %; or about 30 wt % to about 60 wt %; or about 40 wt % to about 60 wt %.

The dispersions of the present disclosure containing submicron hydrophobic agent particles can be stored in a concentrated form prior to use, such as about 30 wt % to about 70 wt %. The concentrated dispersion can be diluted nearer to the time when it is applied to the food. For example, the concentrate can be diluted 1.5-fold, 2-fold, 5-fold, 10-fold, 50-fold, 100-fold, 200-fold, 1000-fold, or more.

The dispersion can further include a rheological modifying agent. Examples of rheological modifying agents include, but are not limited to, agar, alginate, carrageenan, cassia gum, cellulose gum (carboxymethylcellulose), gellan gum, guar gum, hydroxypropyl cellulose, hydroxypropyl methylcellulose, konjac gum, locust bean gum, methylcellulose, microcrystalline cellulose, pectin, starches, xanthan gum, and any combinations thereof. The rheological modifying agent immobilizes the particles of hydrophobic agent and/or the water molecules, thereby extending the period of time for which the dispersion remains stable. In an exemplary embodiment, the addition of a rheological modifying agent can stabilize the dispersion for a period of two years.

The rheological modifying agent makes the dispersion more kosmotropic and less chaotropic.

The rheological modifying agent, when optionally added to the compositions of the present disclosure, is present in an amount from about 0.01 wt % to about 15 wt %, or about 0.01 wt % to about 10 wt %, or about 0.01 wt % to about 5 wt %, or from about 0.1 wt % to about 2 wt %. Alternatively, the rheological modifying agent can be present in an amount from 0 wt % to 15 wt %, or 0 wt % to 10 wt %, or 0 wt % to 5 wt %, or 0 wt % to 2 wt %. Rheological modifying agents are added in particular to help immobilize the particles of edible hydrophobic agents for still longer term stability of the submicron dispersions.

The stability is further manifested in that two or more distinct dispersions can be mixed without upsetting the stability of the various component hydrophobic agent particles, or a dispersion can be diluted into aqueous fluid without upsetting the stability of the component hydrophobic agent particles.

Further, if hydrophobic agent A were not compatible with hydrophobic agent B when mixed, nonetheless a dispersion of the present disclosure of hydrophobic agent A can be mixed with a dispersion of hydrophobic agent B, since the individual particles maintain their integrity. Peppermint Oil and Oleic Acid exemplify such incompatible hydrophobic agents.

Without being bound by theory, it is anticipated that when contacted with food product all or a taste-affecting portion of the particles will be stabilized. It is anticipated that the high surface-to-mass ratio of the particles will accentuate the effect of the hydrophobic agents on taste or aroma or the like. The small size of the hydrophobic agent particles, coupled with their high surface area, is expected to provide greater penetration into food products, again accentuating the effect of the hydrophobic agents on taste or aroma or the like.

When contacted with food, the submicron dispersions of the present disclosure can improve texture, taste, nutrition, aroma, visual properties (e.g., color), volume, moistness, moisture preservation, or the like.

The concentrated or diluted submicron dispersions of edible hydrophobic agents can be applied onto or into the food substrate using any commercially-viable process, such as those well known in the art.

For example, the submicron dispersions can be mixed into milk or milk substitutes (e.g., coconut, soy). Thus, for example, low fat milk can be supplemented with hydrophobic agent dispersions that are highly enriched in heart-healthy polyunsaturated oils. These can enhance the flavor of these milk or milk-like substances without compromising health benefits. Similarly, any number of beverages can be improved. For example, a flavored dispersion can be added to a cocktail to improve nutrition or add flavor (with the flavor for example from oil content or a particularly flavorful hydrophobic agent).

The submicron hydrophobic agent dispersions can provide flavoring for coffee, tea or the like.

When applied to flour, the submicron hydrophobic agent dispersions can provide improved flavor, or improved moisture for products baked therefrom. The dispersion can be mixed with the flour during dough preparation, or premixed.

Also provided is a method of using the composition having an oil-in-water dispersion of the present disclosure to enhance a physical, chemical, nutritional, and/or sensory property of a food. The method includes the step of applying a composition into or onto the food. The composition, as noted above, has an oil phase comprising particles of a hydrophobic agent(s), and an aqueous phase comprising water and/or a water-soluble or water-miscible substance. The oil phase and the aqueous phase are combined and subjected to a mechanical process to form an oil-in-water dispersion having particles of the hydrophobic agent(s) with a small negative surface charge imparted by the amphiphile added and mechanical process employed. The particles of the hydrophobic agent(s) in the oil-in-water dispersion have a polydispersity of 0.25 or less. The particles of the hydrophobic agent in the oil-in-water dispersion have an average particle size of about 100 nm to about 999 nm in diameter. About 75 wt % to about 100 wt % of the particles of the hydrophobic agent(s) in the oil-in-water dispersion have a particle size that is ±300 nm of the average particle size of the hydrophobic agent(s). The small negative surface charge imparted to the hydrophobic particles by the mechanical process causes the particles of the hydrophobic agent(s) to repel each other with a force of repulsion. The stability of the oil-in-water dispersion is enhanced when a sufficient number of particles exceed the electrostatic barrier where the force of repulsion exceeds a force of coalescence among the particles of the hydrophobic agent, thereby preventing aggregation of the particles of the hydrophobic agent(s).

The small average particle size, low polydispersity, and force of repulsion of the particles of the hydrophobic agent(s) in the oil-in-water dispersion increase an extent of penetration of the oil-in-water dispersion throughout a water phase of a substrate of the food, thereby producing a bloom effect distributing the particles of the hydrophobic agent(s) uniformly throughout the water phase of the substrate that enhances a physical, chemical, nutritional and/or sensory property of the food. The physical, chemical, nutritional, and/or sensory property of the food is selected from the group consisting of texture, flavor, taste, nutritional value, softness, tenderizing, uptake of oils, and any combinations thereof.

The small average particle size, low polydispersity, and force of repulsion of the particles of the hydrophobic agent(s) in the oil-in-water dispersion also produce an accelerated diffusion speed of the oil-in-water dispersion throughout a water phase of a substrate of the food.

In addition, the increased extent of penetration and the bloom effect of the oil-in-water dispersion into the water phase of the substrate form a thin moisture barrier on the surface and throughout the food that prevents sublimation of ice crystals from a surface of the substrate, thereby preventing freezer burn of the food.

Although the method indicates the use of the composition, the oil-in-water dispersion is the entire composition applied to the food or beverage.

Also provided is a method of using a composition of the present disclosure having an oil-in-water dispersion to enhance a physical, chemical, nutritional, and/or sensory property of a beverage. The method includes the step of applying the composition into the beverage. The composition, as noted above has an oil phase comprising particles of a hydrophobic agent(s), and an aqueous phase comprising water and/or a water-soluble or water-miscible substance. The oil phase and the aqueous phase are combined and subjected to a mechanical process to form an oil-in-water dispersion having particles of the hydrophobic agent(s) with a small negative surface charge imparted by amphiphile added and mechanical process employed. The particles of the hydrophobic agent(s) in the oil-in-water dispersion have a polydispersity of 0.25 or less. The particles of the hydrophobic agent(s) in the oil-in-water dispersion have an average particle size of about 100 nm to about 999 nm in diameter. About 75 wt % to about 100 wt % of the particles of the hydrophobic agent(s) in the oil-in-water dispersion have a particle size that is ±300 nm of the average particle size of the hydrophobic agent(s). The small negative surface charge imparted to the hydrophobic particles by the mechanical process causes the particles of the hydrophobic agent(s) to repel each other with a force of repulsion. The stability of the oil-in-water dispersion is enhanced when a sufficient number of particles exceed the electrostatic barrier where the force of repulsion exceeds a force of coalescence among the particles of the hydrophobic agent, thereby resisting aggregation of the particles of the hydrophobic agent(s).

The small average particle size, low polydispersity, and force of repulsion of the particles of the hydrophobic agent(s) in the oil-in-water dispersion increase an extent of penetration of the oil-in-water dispersion throughout a water phase of the beverage, thereby producing a bloom effect distributing the particles of the hydrophobic agent(s) uniformly throughout the water phase of the beverage that enhances a physical, chemical, nutritional and/or sensory property of the beverage.

The small average particle size, low polydispersity, and force of repulsion of the particles of the hydrophobic agent(s) in the oil-in-water dispersion further produce an accelerated diffusion speed of the oil-in-water dispersion throughout a water phase of the beverage.

The oil-in-water dispersion, whether added to a hot beverage or to a cold beverage, provides the same enhancement of a physical, chemical, nutritional, and/or sensory property of the beverage.

The physical, chemical, nutritional, and/or sensory property of the beverage is selected from the group consisting of texture, flavor, taste, nutritional value, and any combinations thereof.

The compositions of the present disclosure can be applied to a batter that is used for baking or stovetop cooking, for example, pancake batter. The stable oil-in-water composition permits the rapid and uniform distribution of the hydrophobic agent(s) throughout the flour. The small average particle size, monodispersity (low polydispersity) and force of repulsion of the particles of the hydrophobic agent increase the permeation of the particles of the hydrophobic agent(s) throughout the batter. The same features of the dispersion also accelerate diffusion of the dispersion through the batter, and provide an even (uniform) distribution of the hydrophobic agent(s) in the batter. By contrast, with conventional batters and mixes, oil or butter (hydrophobic agent) will not spread easily into the batter, because the oil gets coated with a layer of the flour and will not mix. The dispersion of the present disclosure permits the hydrophobic agent(s) to permeate rapidly and completely through the batter; the lactones in the oil that give a buttery taste are evenly distributed throughout the batter, improving the taste and flavor of the baked food made from the batter, and improve the cooking characteristics of the batter. In addition, the particles of the hydrophobic agent can form a thin film on the surface of the baked food after the water phase is flashed off the food surface during baking, leaving a uniform, thin coating on the surface that enhances the flavor, and taste of the baked food.

The submicron hydrophobic agent dispersions can be utilized as marinades, where the small particles are anticipated to effectively penetrate the food product such as meat, or any other edible protein source. The ability of the hydrophobic agent dispersions to mix readily and simply with water enables the hydrophobic agent(s) to diffuse more rapidly into the aqueous content of meat. Treated meats can include without limitation, chicken, turkey, beef, buffalo, pork, lamb, goat, fish, scallops, other seafood, or the like.

The submicron dispersions can be utilized to modify sauces, soups, for flavor, nutrition, or the like. Surprisingly, the structural integrity of the hydrophobic agent(s) dispersions is retained even when exposed to temperatures exceeding 80° C.

The submicron dispersions can be utilized to modify any food product that is prepared by hydration, with or without heat. Accordingly, the submicron dispersions can be provided in kits sold together with such hydratable food products, or used in a method to prepare such food products. The submicron dispersions can be contacted with the food during the hydration process. Such food products include, without limitation, pastas, rice, other grains, dried fruit or vegetables (such as dried beans), drink concentrates (such as Kool-Aid or Crystal Light concentrates), or the like. The kits can include kits with freeze-dried meals, and freeze-dried meals sealed in airtight packages, such as aluminum lined packages. Freeze-dried meals include two or more distinct food types that are not comminuted together, such as meat and pasta, or two distinct vegetables.

The submicron dispersions can be utilized as meat tenderizers that include a denaturant, such as, without limitation, an acid (e.g., vinegar) or a peptidase (e.g., papain).

All ranges recited herein include ranges therebetween, and can be inclusive or exclusive of the endpoints. Optional included ranges are from integer values therebetween (or inclusive of one original endpoint), at the order of magnitude recited or the next smaller order of magnitude. For example, if the lower range value is 0.2, optional included endpoints can be 0.3, 0.4, . . . 1.1, 1.2, and the like, as well as 1, 2, 3 and the like; if the higher range is 8, optional included endpoints can be 7, 6, and the like, as well as 7.9, 7.8, and the like. One-sided boundaries, such as 3 or more, similarly include consistent boundaries (or ranges) starting at integer values at the recited order of magnitude or one lower. For example, 3 or more includes 4 or more, or 3.1 or more.

The following embodiments are intended to demonstrate the versatility of submicron hydrophobic agent dispersions. These examples can be utilized as presented or can be diluted in water or water miscible solvent to a concentration that is optimized for a given application. They can also be combined in various ratios to provide multiple benefits to the consumer.

Example 1

A dispersion of the present disclosure was produced from a mixture with the following composition:

| Raw Material | % |
| --- | --- |
| Water | 68.750% |
| Danox 3204 [#449510] (Premier) | 0.050% |
| Canola Oil (Shopright) | 20.000% |
| N/A Butter Flavor 222676A (Flavor Solutions Inc.) | 10.000% |
| Hydrogenated Lecithin (phospholipid) | 1.000% |
| Hydrogenated Phosphatidylcholine (phospholipid) | 0.200% |
| Totals | 100.00% |

The dispersion can be readily mixed with naturally sourced flour to provide a butter flavor to baked goods including but not limited to bread, cookies, snacks, and pastries. It can be combined with high unsaturated and saturated hydrophobic agents to produce butter flavored margarine. Because of the small size of the hydrophobic agent(s), this dispersion can readily diffuse into substrates including but not limited to: beef, pork, chicken, lamb, turkey, duck, fish, crustaceans, deer, boar, and other protein-based foods to impart a buttery taste. The large surface area of the submicron hydrophobic agent dispersion allows the butter flavor to be presented to the taste buds and receptors with high impact.

Example 2

A dispersion of the present disclosure was produced from a mixture with the following composition:

| Raw Material | % |
| --- | --- |
| Miglyol 810N (triglyceride, Sasol) | 15.000% |
| Lutein Ester Crystals (LycoRed, Prod Code 43367) | 11.000% |
| Fructose Crystal (Penta, Product Code 06-24000) | 49.600% |
| Water | 13.550% |
| KLC 99.7% Glycerin, USP Kosher | 7.100% |
| Lecithin (Lipoid) | 3.750% |
| Totals | 100.00% |

The dispersion provides a composition that enables a hydrophobic nutrient, such as lutein, to be incorporated onto or into the food substrate or beverages to transform the food substrate so that it is more physiologically beneficial to the consumer.

Example 3

A dispersion of the present disclosure was produced from a mixture with the following composition:

| Raw Material | % |
| --- | --- |
| Water | 48.900% |
| Peppermint Phytobasic in PG (Bio-Botanica) Product# 3315PBPG; Lot# PS-007-023 | 2.500% |
| Glycerin | 5.000% |
| Euxyl PE9010 (Schulke) | 1.000% |
| Potassium Sorbate | 0.250% |
| Sodium Benzoate | 0.250% |
| Peppermint NF (Lebermuth Company) Item# 70-9162-23, Lot# 1209001342 | 40.000% |
| Hydrogenated Lecithin | 1.500% |
| Hydrogenated Phosphatidylcholine | 0.250% |
| Keltrol CG-RD | 0.350% |
| Totals | 100.00% |

The submicron dispersion of a hydrophobic flavor oil provides a peppermint flavor. Due to its submicron particle size and large surface area, it provides a purer, more impactful mint flavor note or provides a notable cooling sensation compared with surfactant-based systems of peppermint oil. This submicron dispersion can also be used in beverages to enhance taste.

Example 4

A dispersion of the present disclosure was produced from a mixture with the following composition:

| Raw Material | % |
| --- | --- |
| Water | 53.000% |
| Food Grade Canola Oil (Restaurant Depot) | 45.000% |
| Hydrogenated Lecithin | 2.000% |
| Totals | 100.00% |

The dispersion provides a canola oil composition.

Example 5

A dispersion of the present disclosure was produced from a mixture with the following composition:

| Raw Material | % |
| --- | --- |
| Water | 56.080% |
| Natrox RO | 0.100% |
| Potassium Sorbate | 0.250% |
| Sodium Benzoate | 0.250% |
| Methylparaben | 0.200% |
| Propylparaben | 0.050% |
| Disodium EDTA | 0.050% |
| Puglia Extra Virgin Olive Oil | 40.000% |
| Hydrogenated Lecithin | 1.000% |
| Keltrol CG-RD | 0.350% |
| Citric Acid 30% Aq | 1.670% |
| Totals | 100.00% |

The dispersion provides an olive oil composition.

Example 6

A dispersion of the present disclosure was produced from a mixture with the following composition:

| Raw Material | % |
| --- | --- |
| Water | 54.700% |
| Glycerin | 10.000% |
| Benzyl Alcohol | 1.000% |
| Vitamin E Acetate | 1.000% |
| Lipovol G | 30.000% |
| Hydrogenated Lecithin | 2.750% |

| Raw Material | % |
| --- | --- |
| Hydrogenated Phosphatidylcholine | 0.250% |
| Keltrol CG-RD | 0.300% |
| Totals | 100.00% |

The submicron natural oil dispersions found in examples 4, 5, and 6 enhance the flavor, appearance, texture, tenderness, and moistness of proteins. The submicron particle size enables more rapid diffusion of the oil into the meat because it can spread into the moisture already in the meat. This creates a more favorable diffusion force allowing the oil to penetrate more deeply into the protein substrate. These submicron dispersions can also be mixed with vinegar to create a stable salad dressing.

Example 7

A dispersion of the present disclosure was produced from a mixture with the following composition:

| Raw Material | % |
| --- | --- |
| Water | 59.000% |
| BFT Orange Oil (Cold Pressed) 2/25/11 | 40.000% |
| Hydrogenated Lecithin | 1.000% |
| Totals | 100.00% |

The dispersion provides an orange oil composition which can be added to any beverage to impart an orange taste. The submicron dispersion can also be mixed into baked goods to impart an orange flavor to the substrate.

The following exemplary embodiments are provided:

A. An enhanced food comprising a food contacted with a dispersion of particles of edible hydrophobic agent(s) in an aqueous fluid, wherein the average particle size of the dispersion is 100 to 999 nm, and wherein the edible hydrophobic agent(s) of the dispersion comprise about 0.1 wt % to about 70% of the dispersion.

A1. The enhanced food of Embodiment A, wherein the dispersion comprises about 0.01 wt % to about 15 wt % of a rheological modifying agent.

B. The enhanced food of Embodiment A or A1, which is a meat.

C. The enhanced food of Embodiment B, wherein the meat is chicken.

D. The enhanced food of Embodiment B or C, wherein the dispersion further comprises a denaturant.

D1. The enhanced food of Embodiment D, wherein the meat is chicken.

E. The enhanced food of Embodiment A or A1, which is a beverage.

F. The enhanced food of Embodiment E, which is milk or a milk substitute.

G. The enhanced food of Embodiment A or A1, which is a soup or sauce.

H. The enhanced food of Embodiment A or A1, which is a grain flour.

I. An enhanced baked food product comprising the flour of Embodiment H.

J. The enhanced food of Embodiment A, A1 or B-I, wherein about 85% or more by volume of the edible hydrophobic agent particles of the dispersion have a size from about 100 nm to about 999 nm.

K. The enhanced food of Embodiment A, A1 or J, wherein the average particle size of the dispersion is about 100 nm to about 500 nm.

L. The enhanced food of Embodiment A, A1 or J, wherein the average particle size of the dispersion is about 150 nm to about 300 nm.

N. The enhanced food of Embodiment A, A1, B-I, K or L, wherein about 85% or more by volume of the edible hydrophobic agent particles of the dispersion have a size from about 100 nm to about 500 nm.

O. The enhanced food of Embodiment A, A1, B-N, wherein the edible hydrophobic agent(s) of the dispersion comprise about 0.5 wt % to about 50 wt % of the dispersion.

P. The enhanced food of Embodiment A, A1, B-N, wherein the edible hydrophobic agent(s) of the dispersion comprise about 1 wt % to about 50 wt % of the dispersion.

Q. The enhanced food of Embodiment A, A1, B-N, wherein the edible hydrophobic agent(s) of the dispersion comprise about 5 wt % to about 50 wt % of the dispersion.

R. The enhanced food of Embodiment A, A1, B-Q, wherein about 51 wt % or more of the edible hydrophobic agent(s) of the dispersion are canola oil, corn oil, cottonseed oil, sesame oil, vegetable oil, almond oil, hempseed oil, apricot kernel oil, ricebran oil, avocado oil, macadamia nut oil, flaxseed oil, grape seed oil, peanut oil, coconut oil, safflower oil, sesame oil, soybean oil, sunflower oil, walnut oil, olive oil or a mixture thereof.

S. A method of enhancing food comprising contacting the food with a dispersion of particles of edible hydrophobic agent(s) in an aqueous fluid, wherein the average particle size of the dispersion is 100 to 999 nm, and wherein the edible hydrophobic agent(s) of the dispersion comprise about 0.1 wt % to about 70 wt % of the dispersion.

T. The method of enhancing food of Embodiment S, wherein the dispersion comprises about 0.01 wt % to about 15 wt % of a rheological modifying agent.

U. The method of Embodiment S or T, wherein the food is chicken.

V. The method of Embodiment S or T, where the food is one adapted to be prepared by hydration, and the edible hydrophobic agent dispersion is contacted with the food during hydration.

W. The method of Embodiment V, where the food is pasta.

X. The method of Embodiment V, where the food is a grain.

Y. The method of Embodiment V, where the food is a dried fruit or vegetable.

Z. The method of Embodiment V, where the food is a freeze-dried meal.

AA. The method of Embodiment S-Z, comprising (a) providing a first dispersion of particles of edible hydrophobic agent(s) where the average particle size of the dispersion is 100 to 999 nm, wherein the edible hydrophobic agent(s) of the first dispersion comprise about 30 wt % to about 70 wt % of the first dispersion, (b) diluting the first dispersion to form a second dispersion of edible hydrophobic agents with average particle size of 100 to 999 nm, wherein the second dispersion is more dilute than the first, and (c) thereafter conducting the food contacting using the second dispersion.

AB. A kit comprising (a) a food is one adapted to be prepared by hydration and (b) an edible hydrophobic agent dispersion comprising: a dispersion of particles of edible hydrophobic agent(s) in an aqueous fluid, wherein the average particle size is 100 to 999 nm, and wherein the edible hydrophobic agent(s) comprise about 0.01 wt % to about 70 wt % of the dispersion.

AC. The kit of Embodiment AB, wherein the dispersion comprises about 0.01 wt % to about 15 wt % of a rheological modifying agent.

AB1. The kit of Embodiment AB or AC, where the food is pasta.

AC1. The kit of Embodiment AB or AC, where the food is a grain.

AD. The kit of Embodiment AB or AC, where the food is a dried fruit or vegetable.

AE. The kit of Embodiment AB or AC, where the food is a freeze-dried meal.

AF. A dispersion for use in enhancing a food product, comprising: a dispersion of particles of edible hydrophobic agent(s) in an aqueous fluid, wherein the average particle size of the dispersion is 100 to 999 nm, and wherein the edible hydrophobic agent(s) of the dispersion comprise about 0.01 wt % to about 70 wt % of the dispersion.

AG. The food enhancing dispersion of Embodiment AF, wherein the dispersion comprises about 0.01 wt % to about 15 wt % of a rheological modifying agent.

AH. The food enhancing dispersion of Embodiment AG or AH, wherein about 85% or more by volume of the edible hydrophobic agent particles of the dispersion have a size from about 100 nm to about 999 nm.

AI. The food enhancing dispersion of Embodiment AG or AH, wherein the average particle size of the dispersion is about 100 nm to about 500 nm.

AJ. The food enhancing dispersion of Embodiment AG or AH wherein the average particle size of the dispersion is about 150 nm to about 300 nm.

AK. The food enhancing dispersion of Embodiment AG, AH, AI or AJ, wherein about 85% or more by volume of the edible hydrophobic agent particles of the dispersion have a size from about 100 nm to about 500 nm.

AL. The food enhancing dispersion of Embodiment AG, AH, AI, AJ or AK, wherein the edible hydrophobic agent(s) of the dispersion comprise about 0.5 wt % to about 50 wt % of the dispersion.

AM. The food enhancing dispersion of Embodiment AG, AH, AI, AJ or AK, wherein the edible hydrophobic agent(s) of the dispersion comprise about 1 wt % to about 50 wt % of the dispersion.

AN. The food enhancing dispersion of Embodiment AG, AH, AI, AJ or AK, wherein the edible hydrophobic agent(s) of the dispersion comprise about 5 wt % to about 50 wt % of the dispersion.

AO. The food enhancing dispersion of Embodiment AG, AH, AI, AJ, AK, AL, AM or AN, wherein about 51 wt % or more of the edible hydrophobic agent(s) of the dispersion are canola oil, corn oil, cottonseed oil, sesame oil, vegetable oil, almond oil, hempseed oil, apricot kernel oil, ricebran oil, avocado oil, macadamia nut oil, flaxseed oil, grape seed oil, peanut oil, coconut oil, safflower oil, sesame oil, soybean oil, sunflower oil, walnut oil, olive oil or a mixture thereof.

As used in this application, the word "about" for dimensions, weights, and other measures means a range that is ±10% of the stated value, more preferably ±5% of the stated value, and most preferably ±1% of the stated value, including all subranges therebetween.

It should be understood that the foregoing description is only illustrative of the present disclosure. Various alternatives and modifications can be devised by those skilled in the art without departing from the disclosure. Accordingly, the present disclosure is intended to embrace all such alternatives, modifications, and variances that fall within the scope of the disclosure.

What is claimed is:

1. An edible composition that remains stable when diluted with aqueous fluid having one or more oil-in-water dispersions, the composition comprising:
   a first oil-in-water dispersion having an oil phase that comprises one or more hydrophobic particles of a hydrophobic agent and an aqueous phase that comprises either water or water and one or more water-miscible substances;
   wherein the oil phase and the aqueous phase are combined and subjected to a non-surfactant mechanical process that forms the first oil-in-water dispersion with the particles of the hydrophobic agent exhibiting a small negative surface charge;
   wherein the particles of the hydrophobic agent in the first oil-in-water dispersion have a polydispersity of 0.25 or less, an average particle size of between about 100 nm to about 999 nm in diameter, and a net negative charge that is −30 mV or lower;
   wherein between about 75 weight-percent (wt %) to about 100 wt % of the particles of the hydrophobic agent in the first oil-in-water dispersion have a particle size that is ±200 nm of the average particle size of the hydrophobic agent
   wherein the small negative surface charge imparted to the hydrophobic particles by the non-surfactant mechanical process causes the particles of the hydrophobic agent to repel each other with a force of repulsion that sufficiently exceeds the force of coalescence among the particles of the hydrophobic agent, thereby enhancing stability of the first oil-in-water dispersion by resisting aggregation of the particles of the hydrophobic agent.

2. The composition according to claim 1, wherein the first oil-in-water dispersion has a negative zeta potential value.

3. The composition according to claim 1, wherein the particles are in a Gaussian distribution about the average particle size.

4. The composition according to claim 1, wherein about 90 wt % to about 100 wt % of the particles of the hydrophobic agent in the first oil-in-water dispersion have a particle size that is ±200 nm of the average particle size of the hydrophobic agent.

5. The composition according to claim 1, wherein about 95 wt % to about 100 wt % of the particles of the hydrophobic agent in the first oil-in-water dispersion have a particle size that is ±200 nm of the average particle size of the hydrophobic agent.

6. The composition according to claim 1, wherein the particles of the hydrophobic agent in the first oil-in-water dispersion have a particle size that is ±100 nm of the average particle size of the hydrophobic agent.

7. The composition according to claim 1, wherein about 10 wt % to about 100 wt % of the particles of the hydrophobic agent in the first oil-in-water dispersion are over an electrostatic barrier at which the force of repulsion exceeds the force of coalescence.

8. The composition according to claim 7, wherein about 50 wt % to about 100 wt % of the particles of the hydrophobic agent in the first oil-in-water dispersion are over the electrostatic barrier.

9. The composition according to claim 7, wherein about 75 wt % to about 100 wt % of the particles of the hydrophobic agent in the first oil-in-water dispersion are over the electrostatic barrier.

10. The composition according to claim 7, wherein about 95 wt % to about 100 wt % of the particles of the hydrophobic agent in the first oil-in-water dispersion are over the electrostatic barrier.

11. The composition according to claim 1, the composition further comprising a second oil-in-water dispersion, the second oil-in-water dispersion different from the first.

12. The composition according to claim 1, wherein at least 75 wt % of the total particles in the dispersion are ±2 standard deviations of the average particle size.

13. The composition according to claim 1, wherein the oil phase is 0.01 wt % to 70 wt % of the first oil-in-water dispersion.

14. The composition according to claim 1, further comprising 0.01 wt % to 15.0 wt % of one or more rheological modifying agents.

15. The composition according to claim 1, wherein the mechanical processes comprises subjecting the particles of the hydrophobic agent in the combined oil phase and water phase to substantially elastic collisions.

16. The composition according to claim 1, wherein the mechanical processes comprises repeating the mechanical process for at least an additional iteration of the mechanical process to increase monodispersity of a larger wt % of the particles of the hydrophobic agent, and to increase the wt % of the particles of the hydrophobic agent that are over an electrostatic barrier at which the force of repulsion exceeds the force of coalescence, to further enhance stability of the dispersion.

17. The composition according to claim 1, wherein the composition comprises an amphiphilic compound that has a Critical Micelle Concentration (CMC) of $10^{-8}$ mol/L or lower and the composition is substantially surfactant free such that amphiphilic compounds with a CMC of $10^{-8}$ mol/L or lower are present in amounts of 1 part weight to 5 parts weight of other hydrophobic agents, or less.

18. The composition according to claim 17, wherein the amphiphilic compound is a phospholipid.

19. The composition according to claim 1, wherein the weight ratio of hydrophobic agent(s) to surfactant molecules(s) other than amphiphilic compounds with a CMC of $10^{-8}$ mol/L or lower is 10 or more.

* * * * *